(12) United States Patent
Shikama

(10) Patent No.: US 6,452,728 B2
(45) Date of Patent: Sep. 17, 2002

(54) RETROFOCUS LENS SYSTEM AND PROJECTION DISPLAY APPARATUS

(75) Inventor: Shinsuke Shikama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/799,078

(22) Filed: Mar. 6, 2001

(30) Foreign Application Priority Data

May 17, 2000 (JP) ........................... 2000-144317

(51) Int. Cl.$^7$ ................ G02B 9/00; G02B 13/22; G02B 13/04
(52) U.S. Cl. ................ 359/651; 359/663; 359/753
(58) Field of Search ................ 359/649, 651, 359/716, 717, 753, 663

(56) References Cited

U.S. PATENT DOCUMENTS

| | | | | |
|---|---|---|---|---|
| 4,188,092 A | * | 2/1980 | Momiyama | 359/754 |
| 5,218,480 A | | 6/1993 | Mosokovich | 359/753 |
| 5,442,484 A | | 8/1995 | Shikawa | 359/651 |
| 5,625,495 A | | 4/1997 | Moskovich | 359/663 |
| 5,973,848 A | | 10/1999 | Taguchi et al. | 359/651 |
| 2002/0005994 A1 | * | 1/2002 | Shikama | 359/479 |

* cited by examiner

Primary Examiner—Georgia Epps
Assistant Examiner—David N. Spector

(57) ABSTRACT

A retrofocus lens system has a negative first, a positive second and a positive third lens group. The first lens group includes an aspheric first lens, a negative meniscus second and third lenses that are convex on the large conjugate side, and a negative meniscus fourth lens being convex on the small conjugate side. The second lens group includes a positive fifth lens and a sixth lens joined to the fifth lens. The third lens group includes a positive meniscus seventh lens being convex on the small conjugate side, a biconcave eighth lens, a positive ninth lens joined to the eighth lens, a biconvex tenth and eleventh lenses, and an aspheric twelfth lens. The system satisfies $0.8 < f_2/f_3 < 1.5$, $1.6 < |f_1|/f < 2.4$, $|f_4|/f > 30$, $f_5/f > 6$, where f is a focal distance of the system, $f_2$ and $f_3$ are respectively focal distances of the second and third lens groups, $|f_1|$ is an absolute value of a focal distance of the first lens group, $|f_4|$ is an absolute value of an axial focal distance of the first lens, and $f_5$ is an axial focal distance of the twelfth lens.

15 Claims, 14 Drawing Sheets

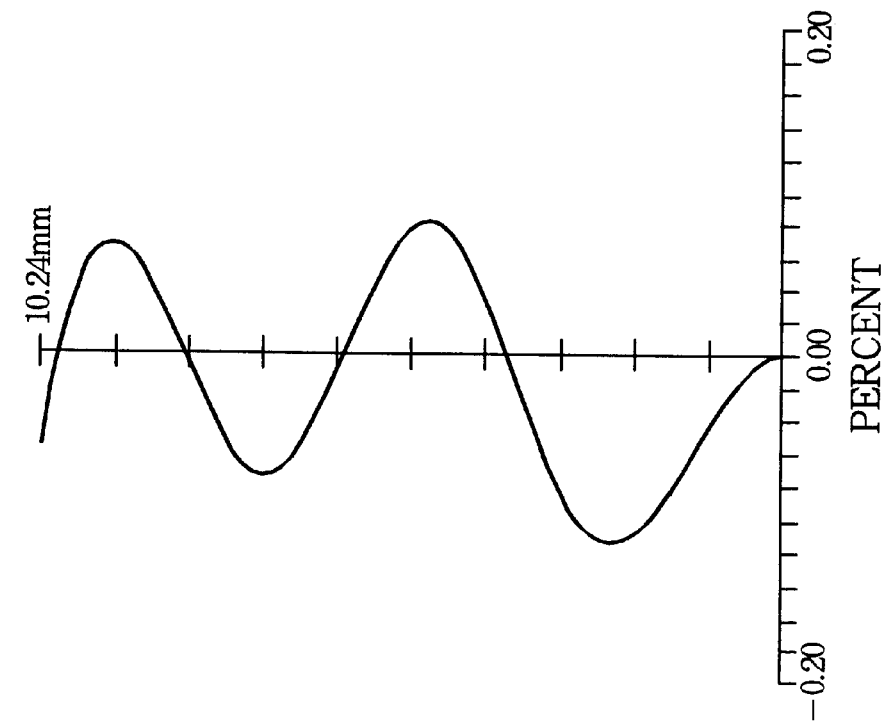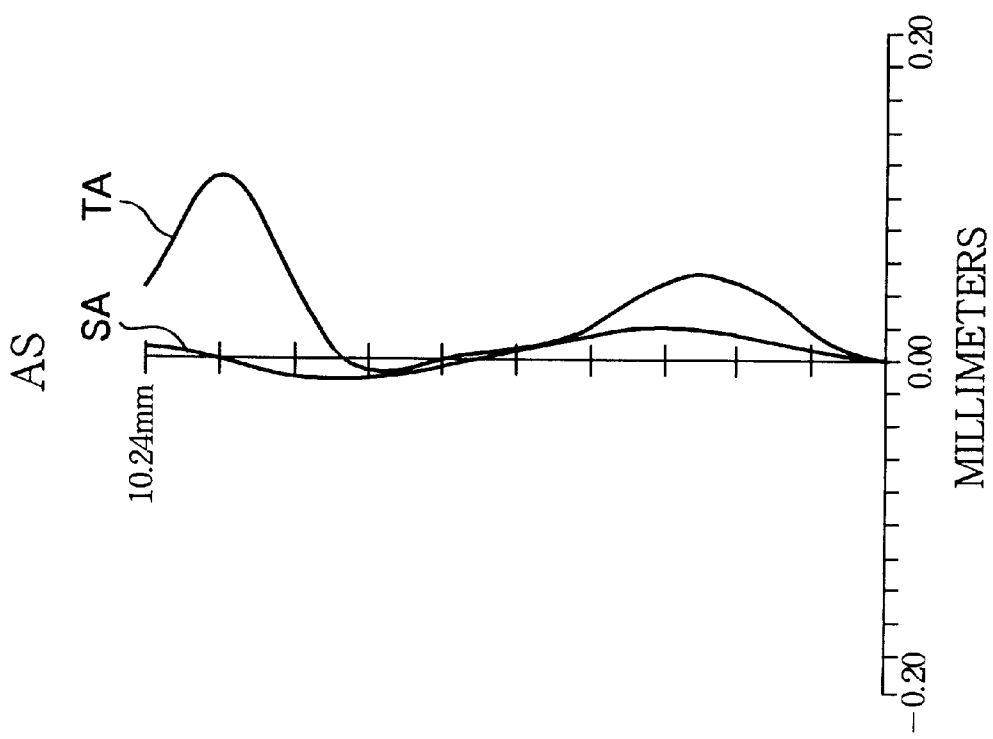

IMA : 0.00 mm

IMA : 10.24 mm

IMA : 0.00 mm

IMA : 10.24 mm

IMA : 0.00 mm

IMA : 10.24 mm

DISTORTION

SCHOTT

| GLASS MATERIAL | $\nu d$ | PgF |
|---|---|---|
| K7 | 60.41 | 0.5422 |
| F2 | 36.37 | 0.5828 |

SCHOTT
$PgF = -0.001689 * \nu d + 0.644224$

OHARA

| GLASS MATERIAL | $\nu d$ | PgF |
|---|---|---|
| NSL7 | 60.49 | 0.5436 |
| PBM2 | 36.26 | 0.5828 |

OHARA
$PgF = -0.001618 * \nu d + 0.641462$

HOYA

| GLASS MATERIAL | $\nu d$ | PgF |
|---|---|---|
| C7 | 60.49 | 0.5393 |
| F2 | 36.30 | 0.5829 |

HOYA
$PgF = -0.001802 * \nu d + 0.648327$

SUMITA

| GLASS MATERIAL | $\nu d$ | PgF |
|---|---|---|
| K7 | 60.5 | 0.547 |
| F2 | 36.3 | 0.583 |

SUMITA
$PgF = -0.001488 * \nu d + 0.637000$

RETROFOCUS LENS SYSTEM AND PROJECTION DISPLAY APPARATUS

BACKGROUND OF THE INVENTION

The present invention relates to a retrofocus lens system suitable for a projection optical system which requires a long back focal distance in comparison with a focal distance and a projection display apparatus incorporating the retrofocus lens system.

FIG. 13 is a schematic diagram showing a configuration of an optical system of a conventional projection display apparatus (a liquid crystal projector). As shown in FIG. 13, the projection display apparatus 300 comprises a light source 1 which includes a lamp 120 and a reflecting mirror 130 and emits approximately parallel illuminating light 2, dichroic mirrors 3B and 3G, and light reflection mirrors 4a, 4b, and 4c. The projection display apparatus 300 further comprises a transmissive liquid crystal panel 5R for displaying a red image, a transmissive liquid crystal panel 5G for displaying a green image, a transmissive liquid crystal panel 5B for displaying a blue image, a dichroic prism 6 which outputs combined light 20 of red (R), green (G), and blue (B) by reflecting the red light 2R and the blue light 2B and passing the green light 2G, and a projection lens 7 for projecting incident light 20 onto a screen 8 with a magnification. In the figure, a reference numeral 200 denotes a housing.

The dichroic mirror 3B receives the light 2 emitted from the light source 1, reflects the blue light 2B, and allows the red light 2R and the green light 2G to pass. The blue light 2B reflected from the dichroic mirror 3B is reflected by the mirror 4b, passes the liquid crystal panel 5B, and then enters the dichroic prism 6. The dichroic mirror 3G reflects the green light 2G that has passed the dichroic mirror 3B and allows the red light 2R to pass. The green light 2G reflected from the dichroic mirror 3G passes the liquid crystal panel 5G and enters the dichroic prism 6. The red light 2R that has passed the dichroic mirror 3B is reflected by the mirrors 4a and 4c, passes the liquid crystal panel 5R, and enters the dichroic prism 6. The dichroic prism 6 sends out the combined light 20 of the incident red light 2R, green light 2G, and blue light 2B toward the projection lens 7. The projection lens 7 projects the combined light 20 onto the screen 8 with a magnification.

In the above-mentioned projection display apparatus, the thick dichroic prism 6 must be disposed between the projection lens 7 and the liquid crystal panels 5R, 5G, and 5B functioning as light valve components, which are picture sources, so that the projection lens 7 requires a long back focal distance.

If the above-mentioned projection display apparatus is used in a rear projector (a rear projection display apparatus), it is preferable that the distance between the projection lens 7 and the screen 8 should be short (that is, the projection lens 7 should have a wide angle of view) in order to reduce the outer dimensions of the apparatus.

Because the spectral transmittance, polarization generation characteristics, and reflectivity of the dichroic prism 6 greatly vary with the incident angle of the light, the design is provided so that the illuminating light striking the liquid crystal panels 5R, 5G, and 5B become approximately parallel light (that is, telecentric illumination is provided). In this case, the light striking the projection lens 7 is approximately parallel light. If this type of optical system uses a conventional wide-angle projection lens having a short back focal distance, the light that passes the perimeter of the liquid crystal panels 5R, 5G, and 5B and then strikes the projection lens 7 is extremely reduced, causing the projection image to become dark at the perimeter of the screen 8. Accordingly, it is desired that the apparatus be configured to make the principal ray of the light coming from the individual points of the picture source approximately parallel to the optical axis of the projection lens 7 (telecentric configuration). This configuration requires such a projection lens that the distance between the projection lens 7 and the position of the pupil is sufficiently greater than the focal distance.

As has been described above, a projection lens used in a projection display apparatus is required to satisfy the basic specifications associated with (1) a wide angle of view, (2) a long back focal distance, and (3) telecentric characteristics on the image display component side. The projection lens of the projection display apparatus is also required to have basic aberration characteristics (4) to (7) described below.

(4) Low chromatic aberration: The chromatic aberration of magnification must be representatively kept around the pixel pitch or preferably suppressed below a half of the pixel pitch, so that the projection magnification difference in primary-color pixels of the projection image is sufficiently reduced. When an ultra-high pressure mercury lamp is used for the illumination light source, the light output may contain a strong spectrum at a wavelength shorter than the inherent spectral wavelength of the blue light, which is on the order of 450 nm to 470 nm, or in the proximity of the mercury g-line (436 nm). In such a situation, it is necessary that the chromatic aberration of magnification for such emission line spectral component be corrected in consideration of the chromatic aberration of magnification for red spectral components so as to suppress violet flare components. It is also necessary to control the longitudinal chromatic aberration so that the focal points for primary colors are placed at the same point.

(5) Low distortion: Since a wide-angle lens for the rear projector projects a rectangular projection image inside the frame of the projection screen, the distortion around the perimeter of the screen often stands out. Accordingly, the deviation of a pixel from its ideal point resulting from the distortion must be representatively restricted to the order of the pixel pitch. In rear projectors for use in CAD, multivision projectors that increase the number of pixels by arranging unit screens formed by rear projection and the like, it is required to control the distortion so that the absolute deviation from an ideal point is restricted to or below a half of the pixel pitch.

(6) Wide operating temperature range: The projection lens should be designed to maintain desired optical characteristics over a wide temperature range, so that the lens can be used in a wide temperature environment in which the projector is placed and can endure the heat generated by the illumination lamp. To provide the wide operating temperature range, it is preferable that the projection lens be configured only by glass lenses. In comparison with plastic materials lens, glass lenses generally exhibit small variations in expansion and refractive index with temperature variations, which favors the maintenance of stable optical characteristics. However, if an aspheric surface is used to correct aberrations, glass lenses have a cost disadvantage. The lens system of the present invention corrects aberrations with plastic aspheric lenses and implements a projection lens with small defocusing due to temperature variations.

(7) High resolution: To project an original image produced by a light valve component having many pixels on the order of one million pixels at a high density, which has been increasingly developed in recent years, with a magnification, a projection lens having a high resolution matching the fine pixel structure of the light valve is needed. To ensure the high resolution of the projection lens, the chromatic aberration and distortion described above, and other axial aberrations and off-axis aberrations must be sufficiently corrected.

SUMMARY OF THE INVENTION

It is an object of the present invention to provide a retrofocus lens system which has a long back focal distance in comparison with a focal distance and telecentric characteristics on the picture source side and allows wide-angle projection, and a projection display apparatus utilizing the retrofocus lens system.

According to the present invention, a retrofocus lens system comprises in order from a large conjugate side toward a small conjugate side: a first lens group having a negative refracting power; a second lens group having a positive refracting power; and a third lens group having a positive refracting power. The first lens group includes in order from the large conjugate side toward the small conjugate side, a first lens having an aspheric surface, a meniscus second lens having a negative refracting power and having a convex surface on the large conjugate side, a meniscus third lens having a negative refracting power and having a convex surface on the large conjugate side, and a meniscus fourth lens having a negative refracting power and having a convex surface on the small conjugate side. The second lens group includes in order from the large conjugate side toward the small conjugate side, a fifth lens having a positive refracting power, and a sixth lens joined to the fifth lens. The third lens group includes in order from the large conjugate side toward the small conjugate side, a meniscus seventh lens having a positive refracting power and having a convex surface on the small conjugate side, a biconcave eighth lens, a ninth lens joined to the eighth lens and having a positive refracting power, a biconvex tenth lens, a biconvex eleventh lens, and a twelfth lens having an aspheric surface. The retrofocus lens system satisfies the following expressions:

$$0.8 < f_2/f_3 < 1.5 \tag{1}$$

$$1.6 < |f_1|/f < 2.4 \tag{2}$$

$$|f_4|/f > 30 \tag{3}$$

$$f_5/f > 6 \tag{4}$$

where f is a focal distance of the whole lens system, $f_2$ is a focal distance of the second lens group, $f_3$ is a focal distance of the third lens group, $|f_1|$ is an absolute value of a focal distance of the first lens group, $|f_4|$ is an absolute value of an axial focal distance of the first lens, and $f_5$ is an axial focal distance of the twelfth lens.

The retrofocus lens system satisfying the expressions (1) to (4) can provide an advantage that off-axis aberrations can be appropriately corrected while the long back focal distance and the telecentric performance are maintained. In addition, by restricting the axial power of the first lens and the twelfth lens, both of which comprise a plastic material, to a small value, the retrofocus lens system can provide another advantage that it can be used over a wide temperature range while defocusing and degradation in the resolution due to the temperature change can be eliminated.

The retrofocus lens system may further comprise a stop disposed between the second lens group and the third lens group; wherein the retrofocus lens system satisfies the following expression:

$$|EXP|/f > 50 \tag{5}$$

where |EXP| is an absolute value of a distance from an image surface on the small conjugate side to a pupil surface on the small conjugate side in the whole lens system.

The retrofocus lens system satisfying the expression (5) can provide an arbitrary choice of the brightness and the focussing performance in accordance with an illumination system up to the projection lens. Further, the retrofocus lens system can project light modulated by the light valve that is subject to the telecentric illumination with a favorable peripheral relative illumination, by increasing the pupil distance on the light valve side.

The retrofocus lens system may satisfy the following expression:

$$BFL/f > 2 \tag{6}$$

where BFL is a back focal distance of the whole lens system.

The retrofocus lens system satisfying the expression (6) can provide a long back focal distance so that a required air spacing can be secured between the light valve and the retrofocus lens system in order to mount a thick prism element, a cover glass which protects the front surface of the light valve and a projection system in an appropriate manner.

The retrofocus lens system may satisfy the following expressions:

$$15 < v_4 < 30 \tag{7}$$

$$15 < v_5 < 30 \tag{8}$$

$$40 < v_7 < 100 \tag{9}$$

$$15 < v_8 < 32 \tag{10}$$

$$20 < v_9 < 50 \tag{11}$$

$$70 < v_{10} < 100 \tag{12}$$

where $v_4$ is an Abbe number at d-line of a glass material forming the fourth lens, $v_5$ is an Abbe number at d-line of a glass material forming the fifth lens, $v_7$ is an Abbe number at d-line of a glass material forming the seventh lens, $v_8$ is an Abbe number at d-line of a glass material forming the eighth lens, $v_9$ is an Abbe number at d-line of a glass material forming the ninth lens, and $v_{10}$ is an Abbe number at d-line of a glass material forming the tenth lens.

The retrofocus lens system satisfying the expressions (7) to (12) can provide appropriate chromatic aberrations (longitudinal chromatic aberration and chromatic aberration of magnification) to suppress a color shift of primary color images which is projected with a magnification and to achieve a high resolution.

The retrofocus lens system may satisfy the following expressions:

$$dPgFm = PgFma(v_d) - PgFn(v_d)$$

$$0.008 < dPgF4 < 0.03 \tag{13}$$

$$0.01 < dPgF5 < 0.025 \tag{14}$$

$$0.01 < dPgF8 < 0.02 \tag{15}$$

$$0.03 < dPgF10 < 0.055 \tag{16}$$

where dPgFm denotes a parameter representing anomalous dispersive properties of the glass material which forms the m-th lens, m being equal to 4, 5, 8 or 10, PgFn($v_d$) denotes a straight line representing a normal partial dispersion ratio in a coordinate system that has the abscissa indicating the Abbe number $v_d$ at d-line and the ordinate indicating a partial dispersion ratio PgF from F-line to g-line, and PgFma($v_d$) denotes an anomalous partial dispersion ratio of the glass material which forms the m-th lens having the Abbe number $v_d$ at d-line.

The retrofocus lens system satisfying the expressions (13) to (16) can provide a satisfactory projection image which is relatively free from flare components in a projection display apparatus including a light source of a short wavelength emission line spectrum.

The retrofocus lens system may satisfy the following expressions:

$$dPgFm = PgFma(v_d) - PgFn(v_d)$$

$$-0.01 < dPgF7 < 0.045 \tag{17}$$

$$-0.015 < dPgF9 < 0.02 \tag{18}$$

where dPgFm denotes a parameter representing anomalous dispersive properties of the glass material which forms the m-th lens, m being equal to 7 or 9, PgFn($v_d$) denotes a straight line representing a normal partial dispersion ratio in a coordinate system that has the abscissa indicating the Abbe number $v_d$ at d-line and the ordinate indicating a partial dispersion ratio PgF from F-line to g-line, and PgFma($v_d$) denotes an anomalous partial dispersion ratio of the glass material which forms the m-th lens having the Abbe number $v_d$ at d-line.

The retrofocus lens system satisfying the expressions (17) and (18) can provide a satisfactory projection image which is relatively free from flare components in a projection display apparatus including a light source of a short wavelength spectrum.

According to another aspect of the present invention, a projection display apparatus comprises: a light source for emitting light; a light valve for two-dimensionally modulating the light from the light source; and the above-mentioned retrofocus lens system for projecting with a magnification the light modulated by the light valve.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2A and 2B respectively show an astigmatism and a distortion of the retrofocus lens system according to Embodiment 1;

DETAILED DESCRIPTION OF THE INVENTION

Further scope of applicability of the present invention will become apparent from the detailed description given hereinafter. However, it should be understood that the detailed description and specific examples, while indicating preferred Embodiments of the invention, are given by way of illustration only, since various changes and modifications will become apparent to those skilled in the art from the detailed description.

Figure 1:
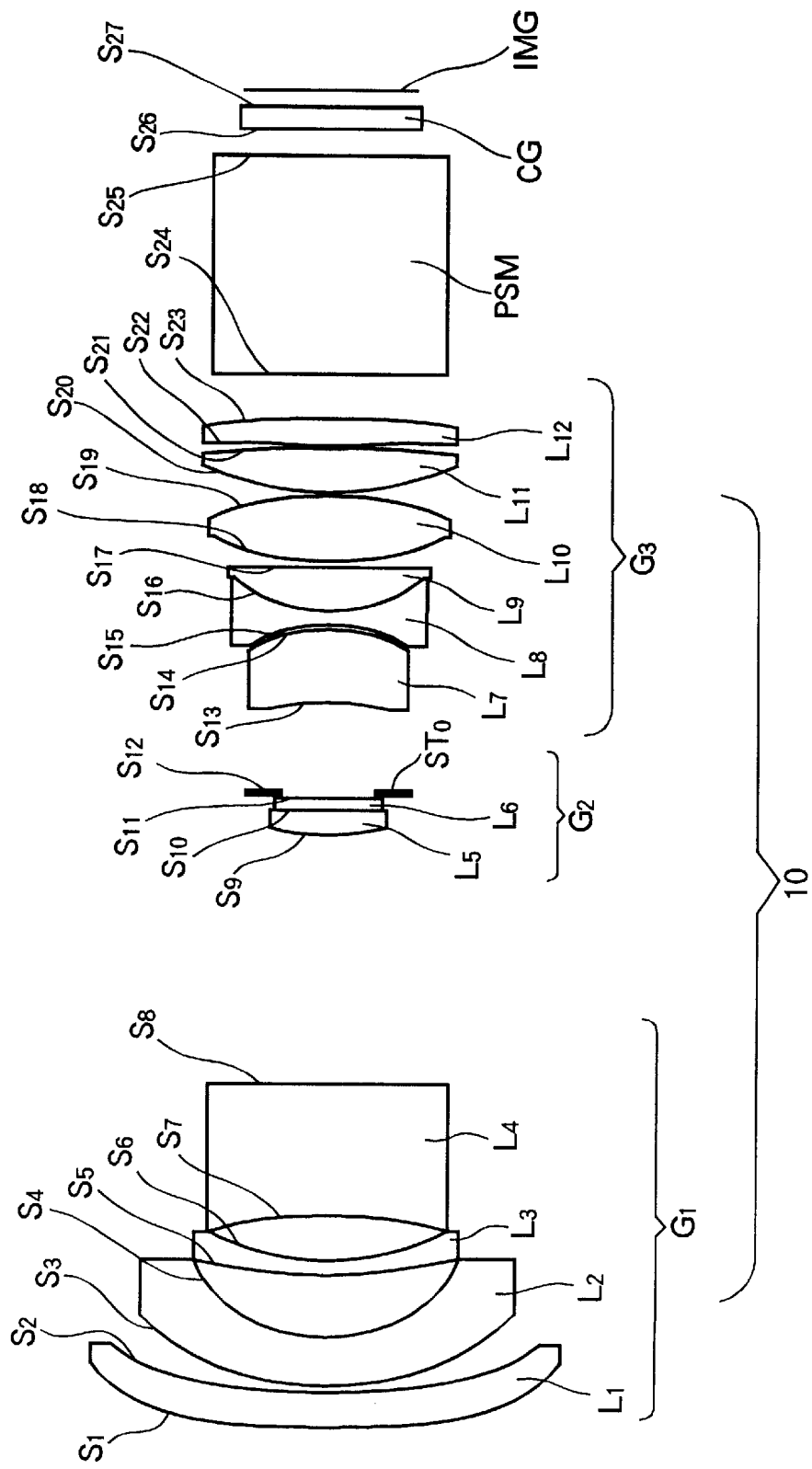
FIG. 1 is a schematic diagram showing a configuration of a retrofocus lens system according to Embodiments 1 to 5 of the present invention.

FIG. 1 is a schematic diagram showing a configuration of a retrofocus lens system according to Embodiments 1 to 5 of the present invention. As shown in FIG. 1, the retrofocus lens system 10 according to Embodiments 1 to 5 comprises a first lens group $G_1$ having a negative refracting power, a second lens group $G_2$ having a positive refracting power, a stop STO (a stop surface being indicated by $S_{12}$), and a third lens group $G_3$ having a positive refracting power, which are sequentially disposed in order from a large conjugate side toward a small conjugate side. The term "large conjugate side" means a projection light emitting side (that is, the screen side in a projection display apparatus using a retrofocus lens system as its projection lens or the left side as viewed in FIG. 1). The term "small conjugate side" means a projection light incident side (that is, the light valve side in a projection display apparatus using a retrofocus lens system as its projection lens or the right side as viewed in FIG. 1).

The first lens group $G_1$ includes, in order from the large conjugate side toward the small conjugate side, a first lens $L_1$ having a weak negative refracting power in the vicinity of the center thereof, a meniscus second lens $L_2$ having a negative refracting power and having a convex surface on the large conjugate side, a meniscus third lens $L_3$ having a negative refracting power and having a convex surface on the large conjugate side, and a meniscus fourth lens $L_4$ having a negative refracting power and having a convex surface on the small conjugate side.

The second lens group $G_2$ includes in order from the large conjugate side toward the small conjugate side, a fifth lens $L_5$ having a positive refracting power and a sixth lens $L_6$ joined to the fifth lens $L_5$.

The third lens group $G_3$ includes in order from the large conjugate side toward the small conjugate side, a meniscus seventh lens $L_7$ having a positive refracting power and having a convex surface on the small conjugate side, a biconcave eighth lens $L_8$, a ninth lens $L_9$ joined to the eighth lens $L_8$ and having a positive refracting power, a biconvex tenth lens $L_{10}$, a biconvex eleventh lens $L_{11}$, and a twelfth lens $L_{12}$ having a weak positive refracting power in the vicinity of the center thereof.

The retrofocus lens system 10 according to Embodiments 1 to 5 satisfies the following expressions (1) to (4):

$$0.8 < f_2/f_3 < 1.5 \qquad (1)$$

$$1.6 < |f_1|/f < 2.4 \qquad (2)$$

$$|f_4|/f > 30 \qquad (3)$$

$$f_5/f > 6 \qquad (4)$$

where r is a focal distance of the whole lens system, $f_2$ is a focal distance of the second lens group $G_2$, $f_3$ is a focal distance of the third lens group $G_3$, $|f_1|$ is an absolute value of a focal distance of the first lens group $G_1$, $|f_4|$ is an absolute value of a focal distance of the first lens $L_1$, and $f_5$ is an axial focal distance of the twelfth lens $L_{12}$.

The retrofocus lens system 10 described above can keep a wide angle of view and can ensure such a long back focal distance that a prism PSM can be disposed between the projection lens and the light valve although the focal distance is short. The principal ray of light from individual image heights, directed from the light valve onto the projection lens, can be kept approximately parallel to the optical axis, a high peripheral relative illumination can be ensured, and an adverse effect on projection images caused by variations in optical properties due to incident angle characteristics for a prism can be eliminated. Both surfaces of the first lens $L_1$ and the twelfth lens $L_{12}$ are aspheric in order to precisely correct spherical aberration, distortion, and other high-order aberrations with a small number of lenses.

The expression (1) represents a condition for ensuring a long back focal distance and maintaining telecentric characteristics. If the upper limit is exceeded, the positive refracting power of the third lens group $G_3$ is too large, making it difficult to provide a telecentric configuration for maintaining off-axis principal rays almost parallel and to correct the distortion. If the lower limit is exceeded, the positive refracting power of the third lens group $G_3$ is too small, weakening the retrofocus performance and making it difficult to keep a long back focal distance.

Further, the expression (2) represents a condition for keeping a long back focal distance, excellently correcting off-axis aberrations by restricting the power of the first lens group $G_1$, and preventing the lens from becoming larger than necessary. If the upper limit is exceeded, the negative refracting power of the first lens group $G_1$ becomes too small, and the retrofocus performance weakens, making it difficult to keep a long back focal distance and making the outside dimensions of the first lens group $G_1$ larger than necessary. If the lower limit is exceeded, the negative refracting power of the first lens group $G_1$ becomes too large, making it difficult to correct off-axis aberrations.

Furthermore, the expressions (3) and (4) respectively represents a condition for restricting the axial power of the first lens $L_1$ and the twelfth lens $L_{12}$, both of which are made of plastic materials, to small values to extend the operating temperature range of the retrofocus lens system 10 while preventing defocusing due to changes in temperature. If the powers of the first lens $L_1$ and the twelfth lens $L_{12}$ increase in such a way that $|f_4|/f$ decreases below 30 and $f_5/f$ decreases below 6, inconveniences occur that a change in the resolution and the defocusing, which results from a change in the environmental temperature at which the retrofocus lens system 10 is used, increases too much.

It is preferable that the retrofocus lens system 10 according to Embodiments 1 to 5 has a stop between the second lens group $G_2$ and the third lens group $G_3$ and is configured to satisfy the following expression (5):

$$|EXP|/f > 50 \qquad (5)$$

where $|EXP|$ is an absolute value of a distance from an image surface on the small conjugate side to a pupil surface on the small conjugate side in the whole lens system.

In the retrofocus lens system 10 which satisfies the expression (5), the principal ray of light from individual image heights, directed from the light valve onto the projection lens, can be kept approximately parallel to the optical axis, a high peripheral relative illumination can be ensured, and an adverse effect on projection images caused by variations in optical properties due to the incident angle characteristics for a prism can be eliminated. If the distance between the pupil surface on the small conjugate side and the image field on the small conjugate side is reduced so that $|EXP|/f$ becomes beyond the lower limit of the expression (5), an inconvenience occurs that the principal ray on the light valve side has too great an inclination.

It is preferable that the retrofocus lens system 10 according to Embodiments 1 to 5 be configured to satisfy the following expression (6):

$$BFL/f > 2 \qquad (6)$$

where BFL is a back focal distance of the whole lens system.

The retrofocus lens system 10 satisfying the expression (6) can ensure such a long back focal distance that a prism PSM, a cover glass CG for protecting the light valve and an appropriate air spacing can be disposed between the projection lens and the light valve despite the wide angle and the short focal distance. If the back focal distance is reduced below the lower limit of the expression (6), an inconvenience occurs in disposing the thick prism PSM, the cover glass CG and the like.

It is preferable that the retrofocus lens system 10 according to Embodiments 1 to 5 be configured to satisfy the following expressions (7), (8), (9), (10), (11), and (12):

$$15 < \nu_4 < 30 \tag{7}$$

$$15 < \nu_5 < 30 \tag{8}$$

$$40 < \nu_7 < 100 \tag{9}$$

$$15 < \nu_8 < 32 \tag{10}$$

$$20 < \nu_9 < 50 \tag{11}$$

$$70 < \nu_{10} < 100 \tag{12}$$

where $\nu_4$ is an Abbe number at d-line of a glass material forming the fourth lens $L_4$, $\nu_5$ is an Abbe number at d-line of a glass material forming the fifth lens $L_5$, $\nu_7$ is an Abbe number at d-line of a glass material forming the seventh lens $L_7$, $\nu_8$ is an Abbe number at d-line of a material forming the eighth lens $L_8$, $\nu_9$ is an Abbe number at d-line of a glass material forming the ninth lens $L_9$, and $\nu_{10}$ is an Abbe number at d-line of a glass material forming the tenth lens $L_{10}$.

In the retrofocus lens system 10 which satisfies the expressions (7) to (12) where the Abbe numbers of the fourth lens $L_4$, the fifth lens $L_5$, the seventh lens $L_7$, the eighth lens $L_8$, the ninth lens $L_9$ and the tenth lens $L_{10}$ are restricted within the respective ranges given above, the axial chromatic aberration and the chromatic aberration of magnification can be controlled in an appropriate manner. When the Abbe numbers of the glass materials which form the respective lenses $L_4$, $L_5$, $L_7$, $L_8$, $L_9$ and $L_{10}$ exceed either the upper or the lower limits of the respective expressions, the axial chromatic aberration, the absolute value of the chromatic aberration of magnification and a correction balance of chromatic aberrations between R-G-B primary colors are collapsed. This results in an insufficient resolution of a particular primary color or colors due to an increased axial chromatic aberration and a deviation of picture elements of a particular primary color or colors due to an increase in the chromatic aberration of magnification.

It is preferable that the retrofocus lens system 10 according to Embodiments 1 to 5 be configured to satisfy the following expressions (13), (14), (15), and (16):

$$dPgFm = PgFma(\nu_d) - PgFn(\nu_d)$$

$$0.008 < dPgF4 < 0.03 \tag{13}$$

$$0.01 < dPgF5 < 0.025 \tag{14}$$

$$0.01 < dPgF8 < 0.02 \tag{15}$$

$$0.03 < dPgF10 < 0.055 \tag{16}$$

where dPgFm denotes a parameter representing anomalous dispersive properties of the glass material which forms the m-th lens, m being equal to 4, 5, 8 or 10, $PgFn(\nu_d)$ denotes a straight line representing a normal partial dispersion ratio in a coordinate system that has the abscissa indicating the Abbe number $\nu_d$ at d-line and the ordinate indicating a partial dispersion ratio PgF from F-line to g-line, and $PgFma(\nu_d)$ denotes an anomalous partial dispersion ratio of the glass material which forms the m-th lens having the Abbe number $\nu_d$ at d-line.

In the above-mentioned expressions, PgF=(ng−nF)/(nF−nC), where ng, nF and nC represent refractive indices at g-line (wavelength of 435.8 nm), F-line (wavelength of 486.1 nm) and C-line (wavelength of 656.3 nm), respectively. The Abbe line used herein represents a straight line joining two points which represent two different varieties of normal partial dispersion glasses in the coordinate system having an ordinate indicating the partial dispersion ratio PgF and an abscissa indicating the Abbe number $\nu_d$. The Abbe lines used in respective glass manufacturers are slightly different to each other, but generally similar. FIGS. 12A to 12D show the Abbe lines used in respective glass manufacturers including SCHOTT GLASS Corporation, OHARA Inc., HOYA Corporation, and SUMITA OPTICAL GLASS Corporation, and these Abbe lines are indicated by the linear functions given below.

SCHOTT: $PgF = -0.001689 * \nu_d + 0.644224$

OHARA: $PgF = -0.001618 * \nu_d + 0.641462$

HOYA: $PgF = -0.001802 * \nu_d + 0.648327$

SUMITA: $PgF = -0.001488 * \nu_d + 0.637000$

In this manner, the Abbe lines have generally similar values, and accordingly, it is only required that dPgFm satisfies the expressions (13) to (16) for either one of the Abbe lines shown in FIGS. 12A to 12D.

The restriction of the anomalous dispersion of glass materials which form the fourth lens $L_4$, the fifth lens $L_5$, the eighth lens $L_8$ and the tenth lens $L_{10}$ within respective given ranges as defined by the expressions (13) to (16) enables an effective reduction of flare components of shorter wavelengths, in particular. For example, when the ultra-high pressure mercury lamp is used as a light source, the illumination light contains an emission line spectrum located near the mercury g-line, but the use of the retrofocus lens system 10 according to Embodiments 1 to 5 allows flare components in the projection image which are attributable to the emission line spectrum to be effectively suppressed. Consequently, when the projection image contains thin letters and lines, problems in which the violet flare components degrade the resolution of the displayed picture and in which, a blurred picture is perceived, can be eliminated. Conversely, if the anomalous dispersion of the individual lenses is chosen to be above the upper limit or below the lower limit of the expressions (13) to (16), an increase of the violet flare components impairs the high picture quality.

It is preferable that the retrofocus lens system 10 according Embodiments 1 to 5 be configured to satisfy the following expressions (17) and (18):

$$-0.01 < dPgF7 < 0.045 \tag{17}$$

$$-0.015 < dPgF9 < 0.02 \tag{18}$$

When the anomalous dispersion of the seventh lens $L_7$ and the ninth lens $L_9$ are restricted to the given ranges in accordance with the expressions (17) and (18) in addition to the correction of aberrations according to the expressions (7) to (12) and the suppression of flares according to the expressions (13) to (16), it is possible to suppress the flare components in the projection image in a more controlled manner. As a consequence, if the projection image contains thin letters or lines, the problems in which the resolution of the displayed picture is degraded by the violet flare components and in which a blurred picture is perceived, can be eliminated. When the anomalous dispersion of the individual lenses is allowed to exceed either the upper or the lower limit of the expressions (17) and (18), an increase of the violet flare components impairs the high picture quality.

Embodiment 1

The components constituting the retrofocus lens system 10 according to Embodiment 1 are specified by numerical examples given in Table 1. In Table 1, characters $S_1$ to $S_{23}$ respectively denote the surfaces of the lenses $L_1$ to $L_{12}$. Characters $S_{24}$ and $S_{25}$ respectively denote surfaces of the prism PSM, and characters $S_{26}$ and $S_{27}$ respectively denote surfaces of the cover glass CG. Further, a character OBJ denotes a screen, a character "R" denotes a radius of curvature of each surface, a character "T" denotes a spacing between the adjacent surfaces, a character $N_d$ denotes a refractive index of a glass material at d-line (helium d-line; a wavelength is 587.56 nm), and a character $v_d$ denotes an Abbe number at d-line. Furthermore, a character TYPE denotes a special surface type, a character ASP denotes an aspheric surface, and a character STO denotes a stop surface.

TABLE 1

| S | R | T | Nd | vd | TYPE |
|---|---|---|---|---|---|
| OBJ | INFINITY | 858.55 | | | |
| 1 | −523.6556 | 4 | 1.491000 | 57.562 | ASP |
| 2 | 514.0728 | 0.5304008 | | | ASP |
| 3 | 33.83429 | 5.479604 | 1.816000 | 46.600 | |
| 4 | 18.11977 | 7.402664 | | | |
| 5 | 60.944 | 1.930828 | 1.516800 | 64.200 | |

$$Z = \frac{Y^2/R}{1 + \{1 - (1+K)Y^2/R^2\}^{\frac{1}{2}}} + DY^4 + EY^6 + FY^8 + GY^{10} + HY^{12} + IY^{14} \quad (19)$$

where a character "Z" is a distance along the optical axis from an apex on the lens surface, a character "Y" is a distance from the optical axis in a direction perpendicular to the optical axis, a character "K" is a conic constant, a character "R" is a radius of curvature, a character "D" is an aspheric coefficient of fourth order, a character "E" is an aspheric coefficient of sixth order, a character "F" is an aspheric coefficient of eighth order, a character "G" is an aspheric coefficient of tenth order, a character "H" is an aspheric coefficient of twelfth order, and a character "I" is an aspheric coefficient of fourteenth order. The aspheric coefficients "K", "D", "E", "F", "G", "H" and "I" have values indicated in Table 2.

TABLE 2

<ASPHERIC COEFFICIENT>

| S | K | D | E | F | G | H | I |
|---|---|---|---|---|---|---|---|
| 1 | 32.79982 | 3.5020967e−5 | −8.659474e−8 | 1.2542213e−10 | −6.6214841e−14 | −1.0583201e−17 | 2.1834647e−20 |
| 2 | −3.143952 | 3.8128909e−5 | −1.3036009e−7 | 2.3490044e−10 | −1.595244e−13 | −2.3343029e−18 | 3.3386459e−20 |
| 22 | −96.65446 | 1.8810461e−6 | −1.372124e−7 | −1.4116834e−10 | 2.6262719e−12 | −9.9308871e−15 | 1.4447615e−17 |
| 23 | −2.165457 | 3.4512883e−6 | −3.2416442e−8 | −4.9537585e−10 | 3.3877491e−12 | −9.6148395e−15 | 1.1066089e−17 |

TABLE 1-continued

| S | R | T | Nd | vd | TYPE |
|---|---|---|---|---|---|
| 6 | 29.00685 | 5.523577 | | | |
| 7 | −62.45322 | 15.25701 | 1.915357 | 21.200 | |
| 8 | −694.9453 | 30.34551 | | | |
| 9 | 26.82546 | 3.041943 | 1.846659 | 23.800 | |
| 10 | −365.2097 | 1.68066 | 1.806100 | 40.730 | |
| 11 | 257.9009 | 0.2485364 | | | |
| 12 | INFINITY | 10.12673 | | | STO |
| 13 | −42.11169 | 6.136205 | 1.668921 | 45.000 | |
| 14 | −23.92971 | 1.092819 | | | |
| 15 | −18.54591 | 1.508804 | 1.846660 | 23.830 | |
| 16 | 18.54591 | 4.072995 | 1.797120 | 35.080 | |
| 17 | 234.3953 | 2.943065 | | | |
| 18 | 35.36946 | 6.982814 | 1.434250 | 95.000 | |
| 19 | −37.2984 | 0.8544881 | | | |
| 20 | 37.99807 | 6.120832 | 1.516800 | 64.200 | |
| 21 | −123.2559 | 0.4768649 | | | |
| 22 | 83.18422 | 3.34 | 1.491000 | 57.562 | ASP |
| 23 | −137.8496 | 5.03 | | | ASP |
| 24 | INFINITY | 26 | 1.516800 | 64.200 | |
| 25 | INFINITY | 3 | | | |
| 26 | INFINITY | 2.74 | 1.471693 | 65.850 | |
| 27 | INFINITY | | | | |

The first lens $L_1$ is formed of a plastic material (PMMA: polymethylmethacrylate) and has aspheric lens surfaces $S_1$ and $S_2$. The twelfth lens $L_{12}$ is also formed of the same PMMA and has aspheric lens surfaces $S_{22}$ and $S_{23}$. The configurations of the lens surfaces $S_1$ and $S_2$ and the lens surfaces $S_{22}$ and $S_{23}$ are defined by the following expression:

Since the first lens $L_1$ and the twelfth lens $L_{12}$ are formed of plastic material as aspheric lenses, the spherical aberration, the distortion and a variety of off-axis aberrations can be favorably corrected. Since the axial focal distance of each plastic lens is chosen to be large with respect to the focal distance of the whole lens system, as indicated by the expressions (3) and (4), it is possible to reduce defocusing accompanying any change in temperature, and variations in resolution of the whole lens system and other imaging optical properties can be suppressed low even if the environmental temperature changes.

The plastic material chosen to form the first lens $L_1$ and the twelfth lens $L_{12}$ is not limited to PMMA, but may be a certain material such as ZEONEX-280S (trade name) available from NIPPON ZEON Corporation or OZ-1000 (trade name) available from HITACHI CHEMICAL Co., Ltd., which are effective in raising the upper limit of the operating temperature range of the whole lens system.

Figure 13:
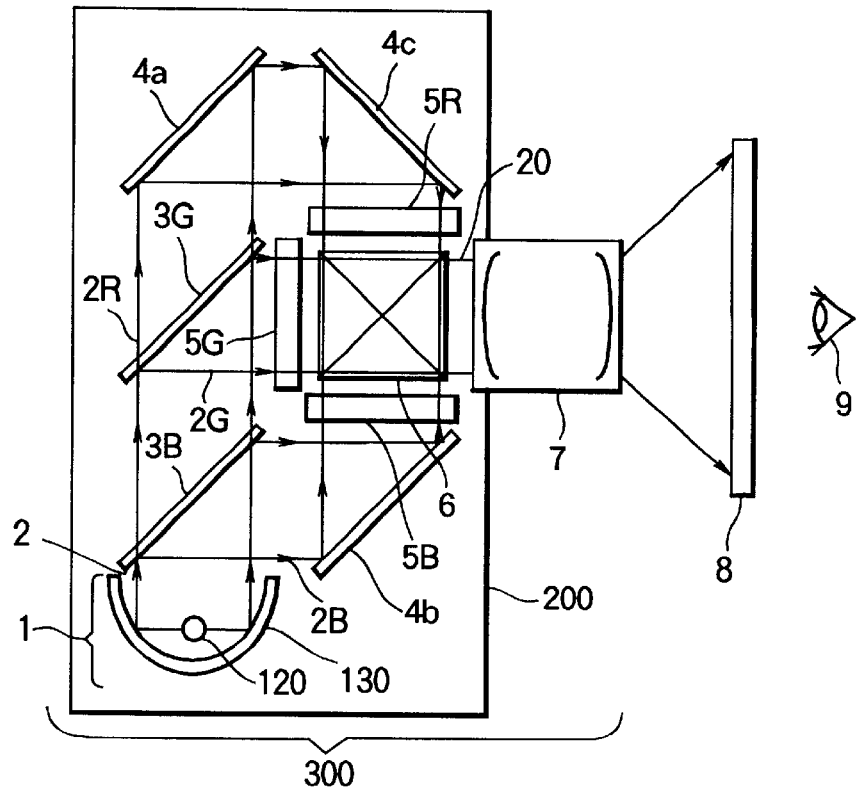
FIG. 13 is a schematic diagram showing a configuration of an optical system of a conventional projection display apparatus or a projection display apparatus according to Embodiment 6 of the present invention.

The stop STO indicated in FIG. 1 and Table 1 is associated with the inclination of the principal ray on the light valve side and adjusts a balance between the resolution and brightness of the projection image. For instance, if the light 20 modulated by the light valve of the apparatus shown in FIG. 13 is substantially parallel to the optical axis of the lens, a sufficient brightness can be obtained even when the aperture diameter of the stop STO is small, thanks to the telecentric characteristics of the projection lens 7. However, the illuminating light 2 actually illuminates the light valve surface with an angle distribution. If the aperture diameter of the stop STO is too small, the projection image cannot be produced with a sufficient brightness. Conversely, if the aperture diameter of the stop STO is increased to ensure sufficient brightness, the resolution of the rays striking the light valve surface at an angle may be impaired. Therefore, it is preferable that the stop STO is configured so that the aperture diameter can be changed as desired in accordance with the combination of the illumination system and the lenses.

$f_2/f_3$, $|f_1|/f$, $|f_4|/f$, $f_5/f$, $|EXP|/f$ and BFL/f of the retrofocus lens system 10 according to Embodiment 1 have values given in Table 11, and $v_4$, $v_5$, $v_7$, $v_8$, $v_9$, $v_{10}$, $dPgF_4$, $dPgF_5$, $dPgF_7$, $dPgF_7$, $dPgF_8$, $dPgF_9$ and $dPgF_{10}$ have values given in Table 12, and the system 10 therefore satisfies the above-mentioned expressions (1) to (18). The fourth lens $L_4$, the fifth lens $L_5$, the seventh lens $L_7$, the eighth lens $L_8$, the ninth lens $L_9$ and the tenth lens $L_{10}$ have dPgF values which are given in Table 13 together with the manufacturer's names as well as the product number of glass materials (GLASS MATERIAL column in Table 13).

Further, the retrofocus lens system 10 according to Embodiment 1 has a long back focal distance so that the prism PSM and the color glass CG located in front of the light valve can be disposed between the retrofocus lens system 10 and the light valve surface while providing a suitable air spacing in the light path from the retrofocus lens system 10 to the image forming surface IMG of the light valve. The design is provided to make the principal ray at each angle of view approximately parallel to the lens optical axis on the light valve side, so that a sufficient peripheral illumination can be obtained and the transmission and reflection in the prism become even in the screen. Therefore, the factors causing inconsistencies in color and brightness of the projection image can be reduced.

FIGS. 2A and 2B show the characteristics of the retrofocus lens system of Embodiment 1, FIG. 2A shows an astigmatism (AS) on the small conjugate side, and FIG. 2B shows a distortion. FIGS. 2A and 2B show the plotted astigmatism and distortion of light having a wavelength of 546.1 nm. In FIG. 2A, TA is a tangential ray in a plane containing the principal off-axis ray and optical axis, and SA is a sagittal ray orthogonal to the tangential surface containing the principal off-axis ray.

Figures 3A, 3B:
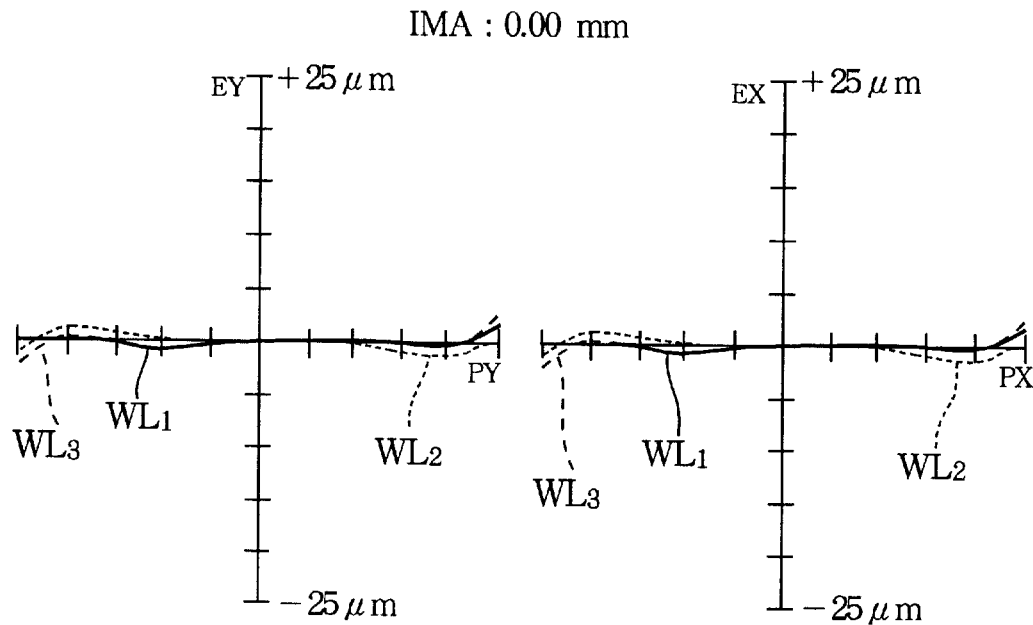
FIGS. 3A and 3B respectively show an axial lateral aberration of the retrofocus lens system according to Embodiment 1.
Figures 3C, 3D:
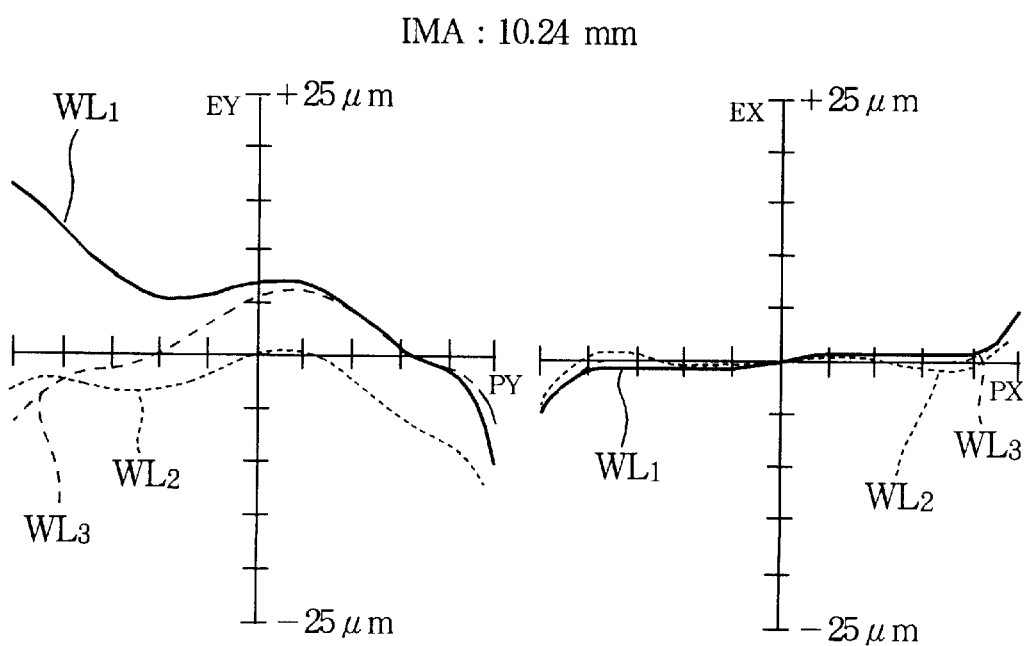
FIGS. 3C and 3D respectively show a lateral aberration at a maximum image height of the retrofocus lens system according to Embodiment 1.

FIGS. 3A to 3D show the characteristics of the retrofocus lens system of Embodiment 1. FIGS. 3A and 3B show an axial (that is, at an image height of 0.00 mm) lateral aberration. FIGS. 3C and 3D show a lateral aberration at an image height of 10.24 mm (an angle of view of 40.8° on the screen side). In the figures, PY denotes a direction of the Y-axis perpendicular to the optical axis, and EY denotes a lateral aberration in the direction of the Y-axis. PX denotes a direction of the X-axis perpendicular to the optical axis and Y-axis, and EX denotes the lateral aberration in the direction of the X-axis. The lateral aberrations of light having a wavelength $WL_1$ (=470 nm), a wavelength $WL_2$ (=546.1 nm), and a wavelength $WL_3$ (=610 nm) are plotted.

Since the projection display apparatus using a light valve having a matrix of pixels can correct the color convergence across the whole screen and the distortion of the projection screen by means of the lens only, the magnitude of chromatic aberration, distortion and the like of the lens directly and greatly affects the quality of the projection image. The retrofocus lens system 10 of Embodiment 1 suppresses the chromatic aberration of the whole lens system, especially chromatic aberration of magnification, by limiting the upper or lower limit of the respective Abbe numbers of the fourth, fifth, seventh, eighth, ninth, and tenth lenses $L_4$, $L_5$, $L_7$, $L_8$, $L_9$ and $L_{10}$ in the expressions (7) to (12) indicated above, so that the color convergence of the primary-color images of the projection image is kept under 7 μm on the light valve surface.

Since the anomalous dispersion of the lenses $L_4$, $L_5$, $L_8$ and $L_{10}$ are restricted in accordance with the expressions (13) to (16), it is possible to suppress the flare components in the projection image, which results from an emission line spectrum located close to the mercury g-line which is contained in the illuminating light emitted from the ultra-high pressure mercury lamp. As a consequence, if the projection image contains thin letters or lines, the problems that the resolution of the displayed picture is degraded by the violet flare components and that a blurred picture is perceived can be eliminated. The flare suppressing effect will be even more effective when the upper and the lower limit of the anomalous dispersion of the lenses $L_7$ and $L_9$ are restricted in accordance with the expressions (17) and (18).

As has been described above, the retrofocus lens system 10 of Embodiment 1 sufficiently corrects both chromatic aberration (the longitudinal chromatic aberration, the chromatic aberration of magnification and the flare components) and distortion and has adequate properties for use in a rear projector. Moreover, the other axial aberrations and the off-axis aberrations are also appropriately corrected so that a light valve having many pixels on the order of million pixels can be projected.

Embodiment 2

The arrangement of the retrofocus lens system 10 according to embodiment 2 is specified by numerical examples given in Table 3 below.

TABLE 3

| S | R | T | Nd | vd | TYPE |
|---|---|---|---|---|---|
| OBJ | INFINITY | 858.55 | | | |
| 1 | −523.6556 | 4 | 1.491000 | 57.562 | ASP |
| 2 | 514.0728 | 0.3460913 | | | ASP |
| 3 | 32.46232 | 5.741718 | 1.815500 | 44.540 | |
| 4 | 17.70302 | 7.509995 | | | |
| 5 | 61.35029 | 1.513102 | 1.516800 | 64.200 | |
| 6 | 28.64692 | 5.370549 | | | |
| 7 | −62.80119 | 15.68162 | 1.952500 | 20.360 | |
| 8 | −591.8352 | 29.28073 | | | |
| 9 | 27.42022 | 2.96639 | 1.846660 | 23.780 | |
| 10 | 523.2012 | 1.640253 | 1.835000 | 42.980 | |
| 11 | 239.0524 | 0.4799632 | | | |
| 12 | INFINITY | 10.7825 | | | STO |
| 13 | −36.80036 | 8.578273 | 1.670030 | 47.110 | |
| 14 | −21.68061 | 0.8112146 | | | |
| 15 | −17.80312 | 1.499474 | 1.806450 | 24.400 | |
| 16 | 17.80312 | 5.136428 | 1.803490 | 30.400 | |
| 17 | 166.289 | 0.7903997 | | | |
| 18 | 36.07789 | 7.570944 | 1.455999 | 90.300 | |
| 19 | −37.86468 | 0.4496936 | | | |
| 20 | 37.05455 | 5.229943 | 1.516800 | 64.200 | |
| 21 | −124.2783 | 0.3900116 | | | |
| 22 | 83.18422 | 3.34 | 1.491000 | 57.562 | ASP |
| 23 | −137.8496 | 5.03 | | | ASP |
| 24 | INFINITY | 26 | 1.516800 | 64.200 | |
| 25 | INFINITY | 3 | | | |
| 26 | INFINITY | 2.74 | 1.471693 | 65.850 | |
| 27 | INFINITY | | | | |

The shapes of the lens surfaces $S_1$ and $S_2$ and the lens surfaces $S_{22}$ and $S_{23}$ are defined by the expression (19) indicated above. The aspheric coefficients "K", "D", "E", "F", "G", "H" and "I" have values indicated in Table 4 below.

TABLE 4

<ASPHERIC COEFFICIENT>

| S | K | D | E | F | G | H | I |
|---|---|---|---|---|---|---|---|
| 1 | 32.79982 | 3.5020967e-5 | -8.659474e-8 | 1.2542213e-10 | -6.6214841e-14 | -1.0583201e-17 | 2.1834647e-20 |
| 2 | -3.143952 | 3.8128909e-5 | -1.3036009e-7 | 2.3490044e-10 | -1.595244e-13 | -2.3343029e-18 | 3.3386459e-20 |
| 22 | -96.65446 | 1.8810461e-6 | -1.372124e-7 | -1.4116834e-10 | 2.6262719e-12 | -9.9308871e-15 | 1.4447615e-17 |
| 23 | -2.165457 | 3.4512883e-6 | -3.2416442e-8 | -4.9537585e-10 | 3.3877491e-12 | -9.6148395e-15 | 1.1066089e-17 |

The values of $f_2/f_3$, $|f_1|/f$, $|f_4|/f$, $f_5/f$, $|EXP|/f$ and $BFL/f$ in the retrofocus lens system 10 according to Embodiment 2 are indicated in Table 11, which is described later. Further, the values of $v_4$, $v_5$, $v_7$, $v_8$, $v_9$, $v_{10}$, dPgF4, dPgF5, dPgF7, dPgF8, dPgF9 and dPgF10 are indicated in Table 12, which is described later. The retrofocus lens system 10 according to Embodiment 2 therefore satisfies the expressions (1) to (18) indicated above. The values of dPgF of the fourth lens $L_4$, the fifth lens $L_5$, the seventh lens $L_7$, the eighth lens $L_8$, the ninth lens $L_9$ and the tenth lens $L_{10}$ are indicated in Table 14 together with the manufacturers's names and product numbers of glass materials (GLASS MATERIAL column in Table 14).

Figure 4B:
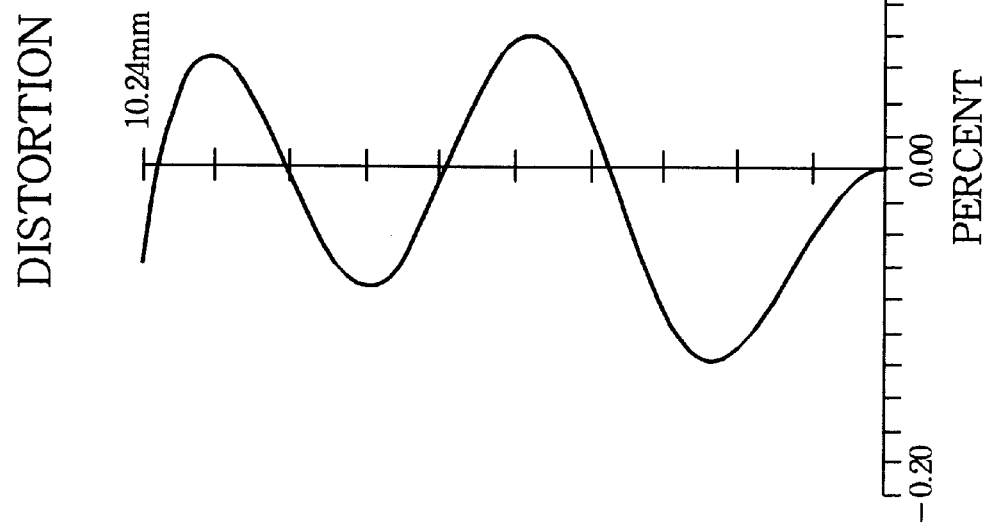
FIGS. 4A and 4B respectively show an astigmatism and a distortion of the retrofocus lens system according to Embodiment 2.
Figure 4A:
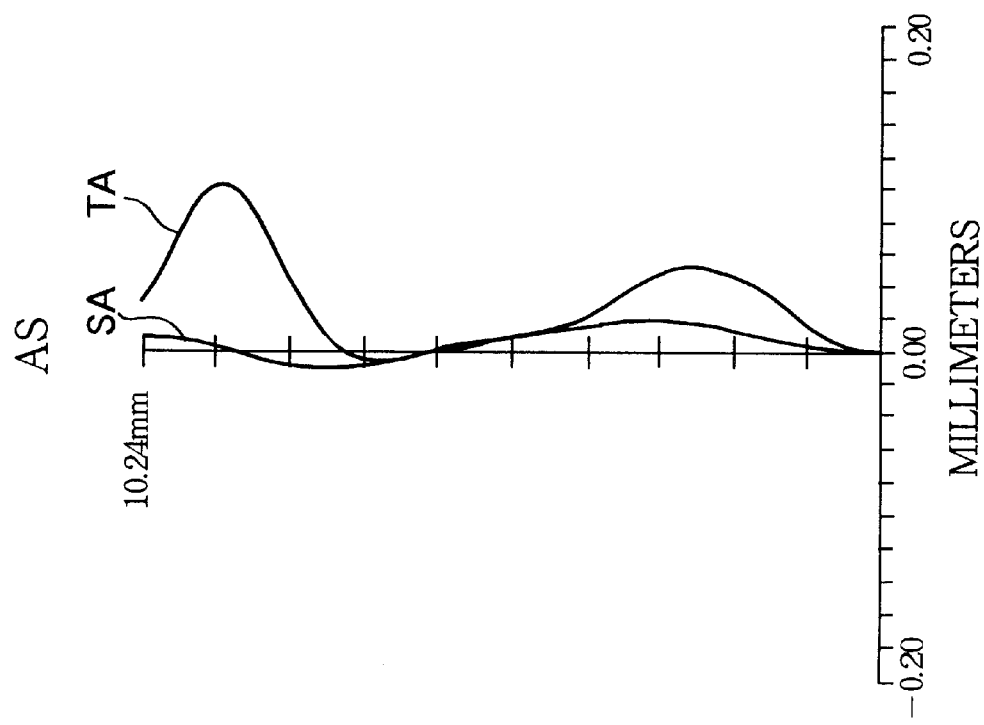

FIGS. 4A and 4B show the characteristics of the retrofocus lens system of Embodiment 2, FIG. 4A shows an astigmatism (AS) on the small conjugate side, and FIG. 4B shows a distortion. FIGS. 4A and 4B show the plotted astigmatism and distortion of light having a wavelength of 546.1 nm.

Figures 5A, 5B:
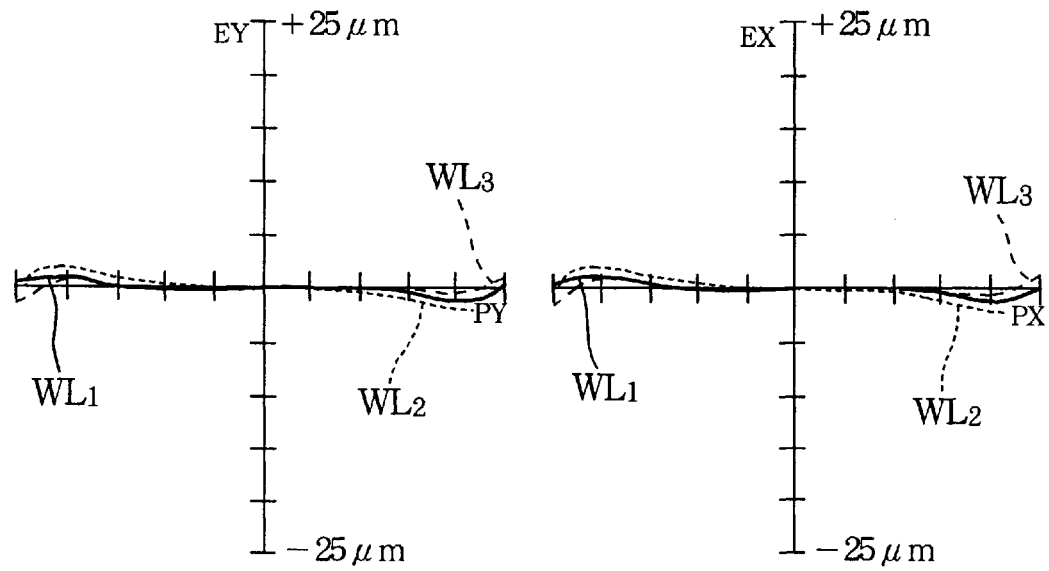
FIGS. 5A and 5B respectively show an axial lateral aberration of the retrofocus lens system according to Embodiment 2.
Figures 5C, 5D:
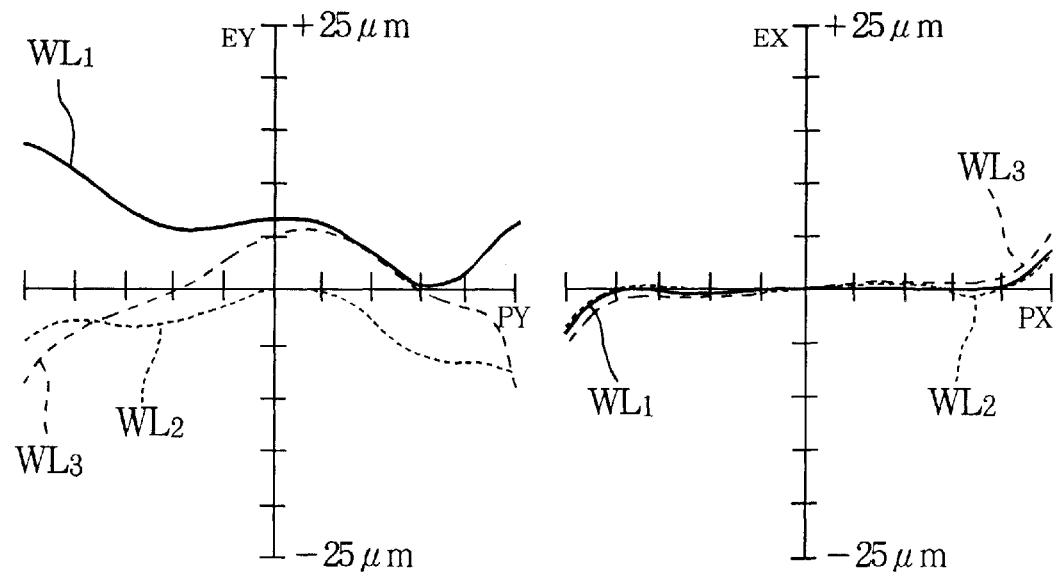
FIGS. 5C and 5D respectively show a lateral aberration at a maximum image height of the retrofocus lens system according to Embodiment 2.

FIGS. 5A to 5D show the characteristics of the retrofocus lens system of Embodiment 2. FIGS. 5A and 5B show an axial (that is, at an image height of 0.00 mm) lateral aberration. FIGS. 5C and 5D show a lateral aberration at an image height of 10.24 mm (an angle of view of 40.8° on the screen side). The lateral aberrations of light having a wavelength $WL_1$ (=470 nm), a wavelength $WL_2$ (=546.1 nm), and a wavelength $WL_3$ (=610 nm) are plotted. In other respects, Embodiment 2 is the same as Embodiment 1.

Embodiment 3

The arrangement of the retrofocus lens system 10 according to Embodiment 3 is specified by numerical examples given in Table 5 below.

TABLE 5

| S | R | T | Nd | vd | TYPE |
|---|---|---|---|---|---|
| OBJ | INFINITY | 858.55 | | | |
| 1 | -523.6556 | 4 | 1.491000 | 57.562 | ASP |
| 2 | 514.0728 | 0.290537 | | | ASP |
| 3 | 35.40269 | 6.328004 | 1.815500 | 44.540 | |
| 4 | 17.97651 | 9.225756 | | | |
| 5 | 732.3459 | 1.511957 | 1.565800 | 61.000 | |
| 6 | 39.71425 | 4.475727 | | | |
| 7 | -61.05018 | 17.00026 | 1.846660 | 23.830 | |
| 8 | -88.2142 | 25.28463 | | | |
| 9 | 31.6968 | 7.644573 | 1.806450 | 24.400 | |
| 10 | -56.61138 | 1.525936 | 1.850259 | 32.300 | |
| 11 | 400.5343 | 0.2472514 | | | |
| 12 | INFINITY | 6.278201 | | | STO |
| 13 | -45.30546 | 7.217551 | 1.668921 | 45.000 | |
| 14 | -29.10246 | 1.844334 | | | |
| 15 | -22.93409 | 1.499244 | 1.806450 | 24.400 | |
| 16 | 22.93409 | 5.404707 | 1.880670 | 41.010 | |
| 17 | 84.79871 | 3.100244 | | | |
| 18 | 35.30042 | 6.928448 | 1.438750 | 95.000 | |
| 19 | -39.75226 | 0.3045151 | | | |
| 20 | 38.59989 | 5.269955 | 1.565800 | 61.000 | |
| 21 | -120.6387 | 0.4012553 | | | |
| 22 | 83.18422 | 3.34 | 1.491000 | 57.562 | ASP |
| 23 | -137.8496 | 5.03 | | | ASP |
| 24 | INFINITY | 26 | 1.516800 | 64.200 | |
| 25 | INFINITY | 3 | | | |
| 26 | INFINITY | 2.74 | 1.471693 | 65.850 | |
| 27 | INFINITY | | | | |

The shapes of the lens surfaces $S_1$ and $S_2$ and the lens surfaces $S_{22}$ and $S_{23}$ are defined by the expression (19) indicated above. The aspheric coefficients "K", "D", "E", "F", "G", "H" and "I" have values indicated in Table 6 below.

TABLE 6

<ASPHERIC COEFFICIENT>

| S | K | D | E | F | G | H | I |
|---|---|---|---|---|---|---|---|
| 1 | 32.79982 | 3.5020967e-5 | -8.659474e-8 | 1.2542213e-10 | -6.6214841e-14 | -1.0583201e-17 | 2.1834647e-20 |
| 2 | -3.143952 | 3.8128909e-5 | -1.3036009e-7 | 2.3490044e-10 | -1.595244e-13 | -2.3343029e-18 | 3.3386459e-20 |
| 22 | -96.65446 | 1.8810461e-6 | -1.372124e-7 | -1.4116834e-10 | 2.6262719e-12 | -9.9308871e-15 | 1.4447615e-17 |
| 23 | -2.165457 | 3.4512883e-6 | -3.2416442e-8 | -4.9537585e-10 | 3.3877491e-12 | -9.6148395e-15 | 1.1066089e-17 |

The values of $f_2/f_3$, $|f_1|/f$, $|f_4|/f$, $f_5/f$, $|EXP|/f$ and $BFL/f$ in the retrofocus lens system 10 according to Embodiment 3 are indicated in Table 11, which is described later. Further, the values of $v_4$, $v_5$, $v_7$, $v_8$, $v_9$, $v_{10}$, dPgF4, dPgF5, dPgF7, dPgF8, dFgF9 and dPgF10 are indicated in Table 12, which is described later. The retrofocus lens system 10 according to Embodiment 3 therefore satisfies the expressions (1) to (18) indicated above. The values of dPgF of the fourth lens $L_4$, the fifth lens $L_5$, the seventh lens $L_7$, the eighth lens $L_8$, the ninth lens $L_9$ and the tenth lens $L_{10}$ are indicated in Table 15 together with the manufacturers' names and product numbers of glass materials (GLASS MATERIAL column).

Figure 6A:
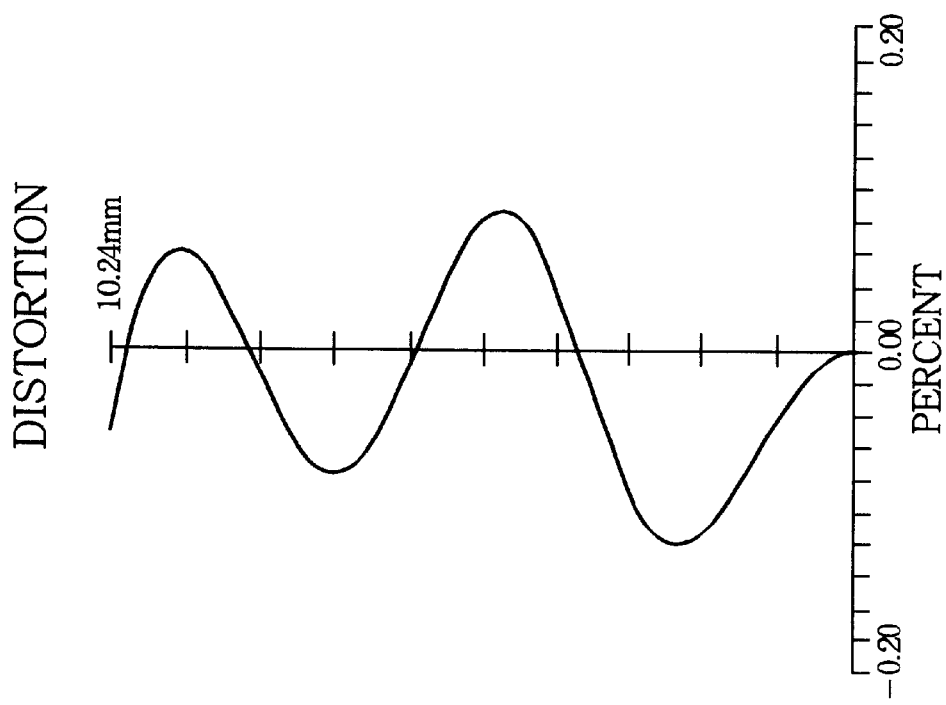
FIGS. 6A and 6B respectively show an astigmatism and a distortion of the retrofocus lens system according to Embodiment 3.
Figure 6B:
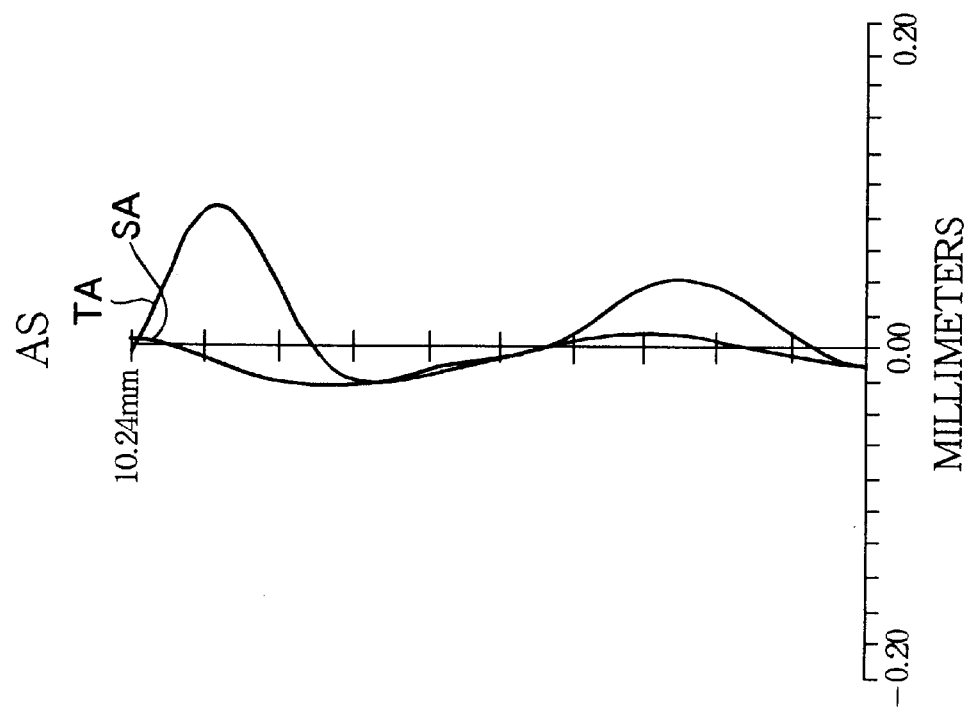
Figures 7A, 7B:
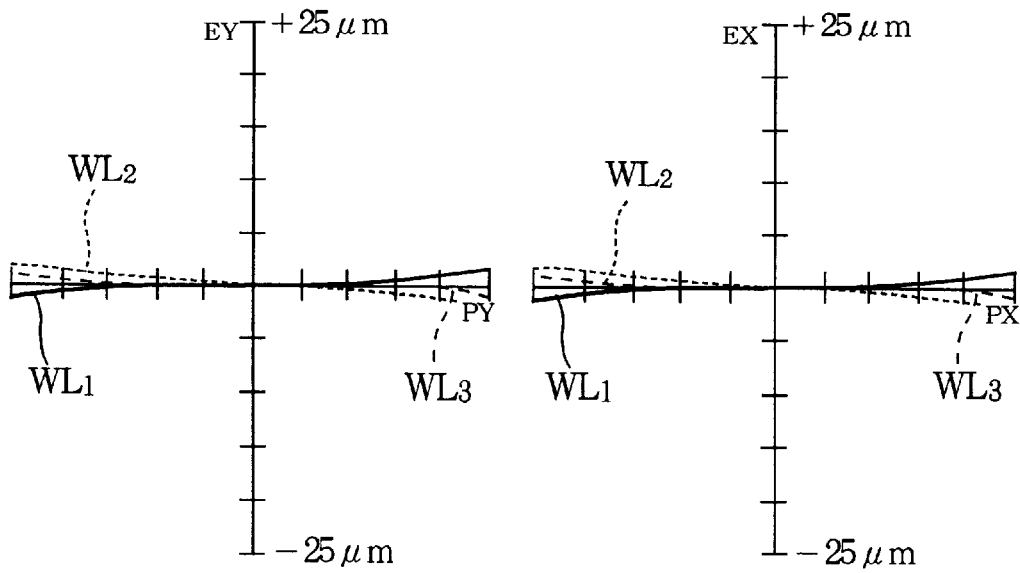
FIGS. 7A and 7B respectively show an axial lateral aberration of the retrofocus lens system according to Embodiment 3.
Figures 7C, 7D:
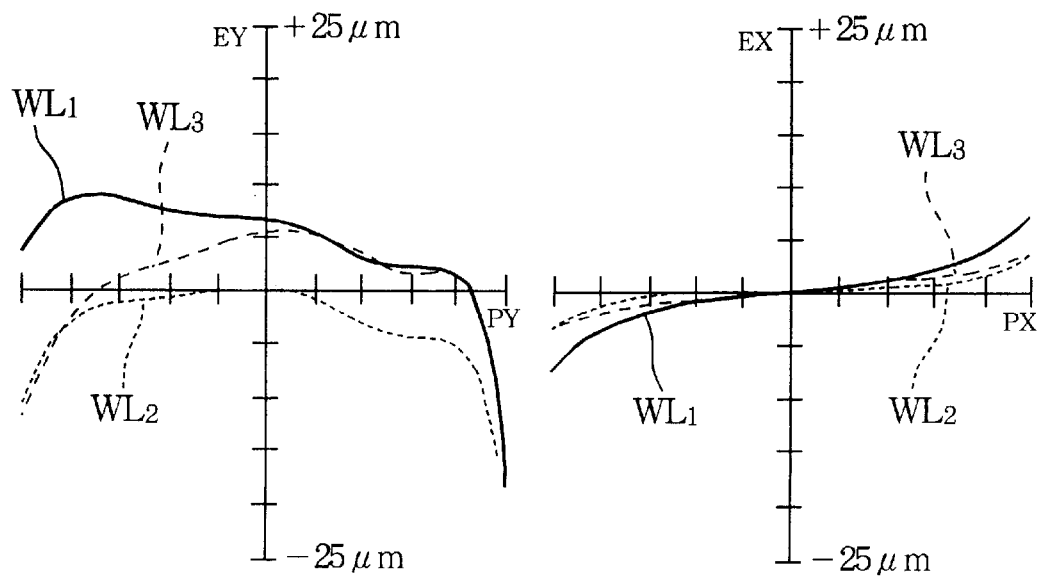
FIGS. 7C and 7D respectively show a lateral aberration at a maximum image height of the retrofocus lens system according to Embodiment 3.

The astigmatism (AS) on the small conjugate side and the distortion of the present lens system are shown in FIGS. 6A and 6B, while the lateral aberration is shown in FIGS. 7A to 7D. The astigmatism and the distortion of light having a wavelength of 546.1 nm are plotted in FIGS. 6A and 6B. The lateral aberration with a wavelength $WL_1$ (=470 nm), a wavelength $WL_2$ (=546.1 nm), and a wavelength $WL_3$ (=610 nm) is plotted in FIGS. 7A to 7D. FIGS. 7A and 7B show the lateral aberration on the axis and FIGS. 7C and 7D show the lateral aberration at the maximum image height of 10.24 nm (with an angle of view of 40.8° on the screen side). In other respects, Embodiment 3 is the same as Embodiment 1.

Embodiment 4

The arrangement of the retrofocus lens system 10 according to Embodiment 4 is specified by numerical examples given in Table 7 below.

TABLE 7

| S | R | T | Nd | vd | TYPE |
|---|---|---|---|---|---|
| OBJ | INFINITY | 858.55 | | | |
| 1 | −523.6556 | 4 | 1.491000 | 57.562 | ASP |
| 2 | 514.0728 | 0.3106203 | | | ASP |
| 3 | 32.11425 | 4.897889 | 1.815500 | 44.540 | |
| 4 | 18.13915 | 9.891571 | | | |
| 5 | 615.953 | 1.867131 | 1.516800 | 64.200 | |
| 6 | 38.07008 | 4.872353 | | | |
| 7 | −55.8922 | 10.76093 | 1.952500 | 20.360 | |
| 8 | −158.9936 | 33.43624 | | | |
| 9 | 27.15409 | 1.71539 | 1.846660 | 23.780 | |
| 10 | 65.88343 | 1.703782 | 1.835000 | 42.980 | |
| 11 | 389.4769 | 1.885492 | | | |
| 12 | INFINITY | 10.1411 | | | STO |
| 13 | −34.59501 | 7.346158 | 1.434250 | 95.000 | |
| 14 | −20.98952 | 1.303026 | | | |
| 15 | −16.54598 | 1.698124 | 1.806450 | 24.400 | |
| 16 | 16.54598 | 5.182819 | 1.784696 | 26.300 | |
| 17 | 173.9901 | 0.2414552 | | | |
| 18 | 35.77961 | 8.228911 | 1.455999 | 90.300 | |
| 19 | −29.56398 | 0.734205 | | | |
| 20 | 38.65487 | 5.236639 | 1.516800 | 64.200 | |
| 21 | −96.22279 | 0.312764 | | | ASP |
| 22 | 83.18422 | 3.34 | 1.491000 | 57.562 | ASP |
| 23 | −137.8496 | 5.03 | | | ASP |
| 24 | INFINITY | 26 | 1.516800 | 64.200 | |
| 25 | INFINITY | 3 | | | |
| 26 | INFINITY | 2.74 | 1.471693 | 65.850 | |
| 27 | INFINITY | | | | |

The shapes of the lens surfaces $S_1$ and $S_2$ and the lens surfaces $S_{22}$ and $S_{23}$ are defined by the expression (19) indicated above. The aspheric coefficients "K", "D", "E", "F", "G", "H" and "I" have values indicated in Table 8 below.

The values of $f_2/f_3$, $|f_1|/f$, $|f_4|/f$, $f_5/f$, $|EXP|/f$ and $BFL/f$ in the retrofocus lens system 10 according to Embodiment 4 are indicated in Table 11, which is described later. Further, the values of $v_4$, $v_5$, $v_7$, $v_8$, $v_9$, $v_{10}$, dPgF4, dPgF5, dPgF7, dPgF8, dPgF9 and dPgF10 are indicated in Table 12, which is described later. The retrofocus lens system 10 according to Embodiment 4 therefore satisfies the expressions (1) to (18) indicated above. The values of dPgF of the fourth lens $L_4$, the fifth lens $L_5$, the seventh lens $L_7$, the eighth lens $L_8$, the ninth lens $L_9$ and the tenth lens $L_{10}$ are indicated in Table 16 together with the manufacturers' names and product numbers of glass materials (GLASS MATERIAL column in Table 16).

Figure 8B:
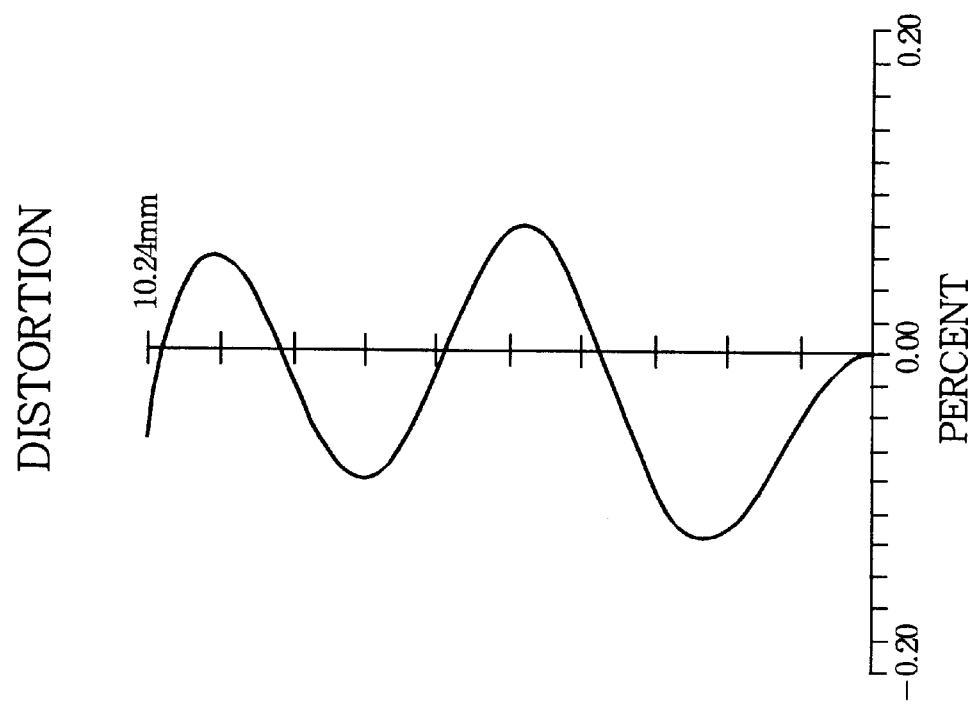
FIGS. 8A and 8B respectively show an astigmatism and a distortion of the retrofocus lens system according to Embodiment 4.
Figure 8A:
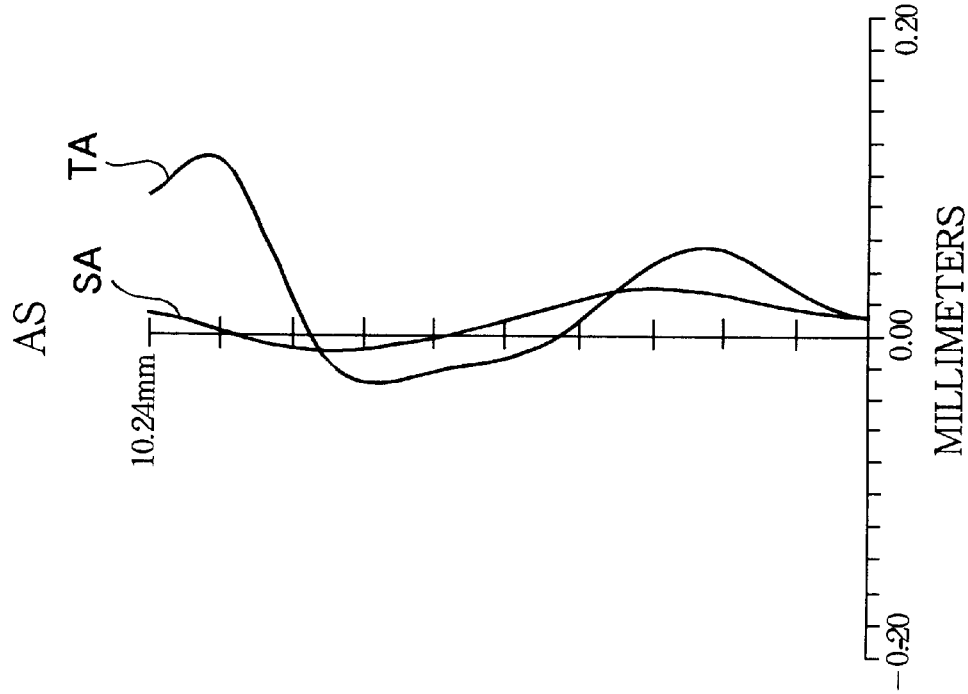
Figure 9A:
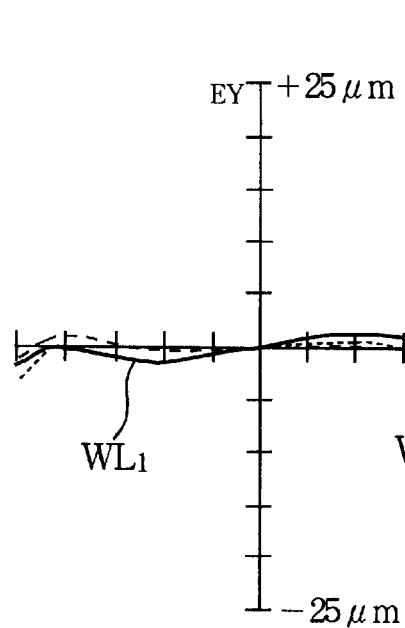
FIGS. 9A and 9B respectively show an axial lateral aberration of the retrofocus lens system according to Embodiment 4.
Figure 9B:
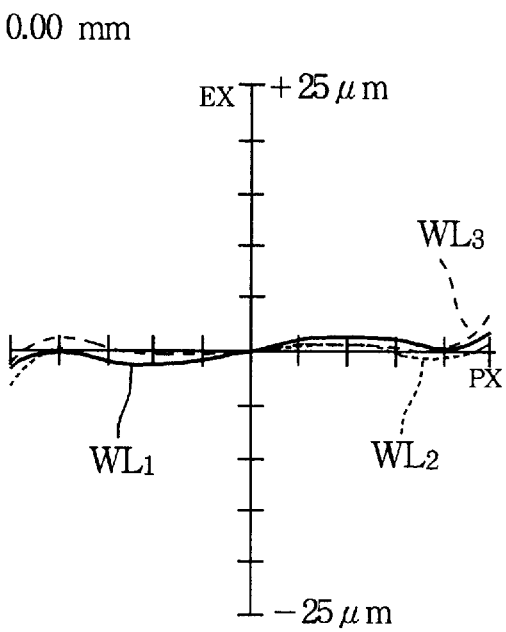
Figure 9C:
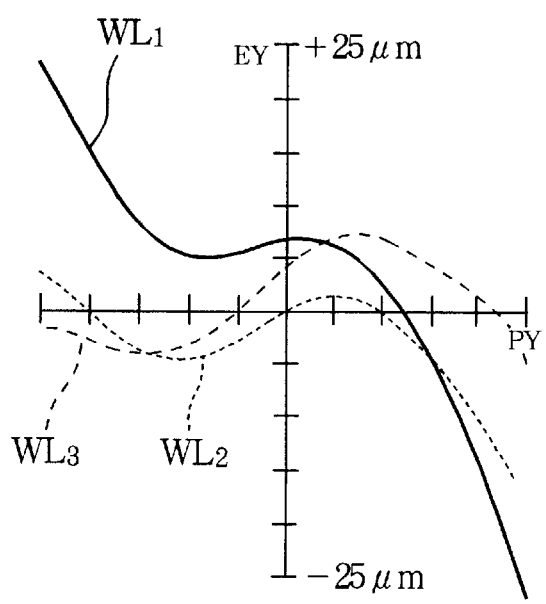
FIGS. 9C and 9D respectively show a lateral aberration at a maximum image height of the retrofocus lens system according to Embodiment 4.
Figure 9D:
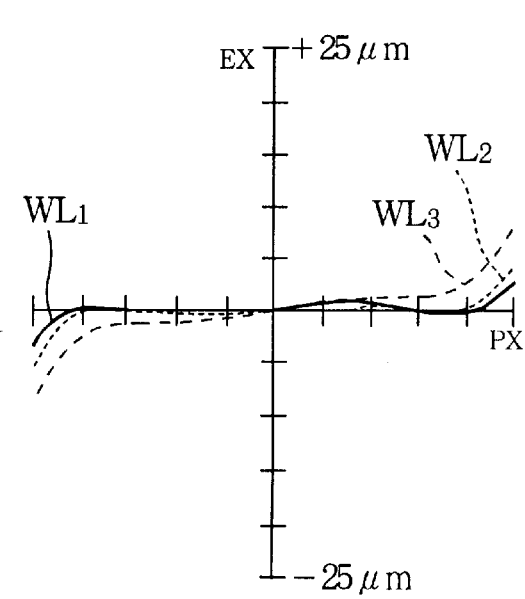

The astigmatism (AS) on the small conjugate side and the distortion of the present lens system are shown in FIGS. 8A and 8B, while the lateral aberration is shown in FIGS. 9A to 9D. The astigmatism and the distortion of light having a wavelength of 546.1 nm are plotted in FIGS. 8A and 8B. The lateral aberration with a wavelength $WL_1$ (=470 nm), a wavelength $WL_2$ (=546.1 nm), and a wavelength $WL_3$ (=610 nm) is plotted in FIGS. 9A to 9D. FIGS. 9A and 9B show the lateral aberration on the axis and FIGS. 9C and 9D show the lateral aberration at the maximum image height of 10.24 nm (with an angle of view of 40.7° on the screen side). In other respects, Embodiment 4 is the same as Embodiment 1.

Embodiment 5

The arrangement of the retrofocus lens system 10 according to Embodiment 5 is specified by numerical examples given in Table 9 below.

TABLE 9

| S | R | T | Nd | vd | TYPE |
|---|---|---|---|---|---|
| OBJ | INFINITY | 858.55 | | | |
| 1 | −523.6556 | 4 | 1.491000 | 57.562379 | ASP |
| 2 | 514.0728 | 0.2507191 | | | ASP |
| 3 | 31.79713 | 5.83051 | 1.815500 | 44.540001 | |
| 4 | 17.41408 | 8.94829 | | | |
| 5 | 250.0999 | 1.500401 | 1.518206 | 65.000000 | |
| 6 | 32.69828 | 5.044313 | | | |
| 7 | −50.54402 | 17.00136 | 1.808095 | 22.800000 | |
| 8 | −116.8878 | 28.05658 | | | |
| 9 | 27.78104 | 2.077707 | 1.784700 | 26.100000 | |
| 10 | −379.0815 | 1.499639 | 1.822230 | 37.450001 | |
| 11 | 192.1694 | 1.933463 | | | |
| 12 | INFINITY | 13.95595 | | | STO |
| 13 | −33.44034 | 1.499981 | 1.670030 | 47.110001 | |
| 14 | −17.82397 | 0.4832298 | | | |
| 15 | −15.78343 | 1.498544 | 1.806450 | 24.400000 | |
| 16 | 15.78343 | 5.389283 | 1.784723 | 25.700000 | |
| 17 | 188.8437 | 0.2447158 | | | |

TABLE 8

<ASPHERIC COEFFICIENT>

| S | K | D | E | F | G | H | I |
|---|---|---|---|---|---|---|---|
| 1 | 32.79982 | 3.5020967e−5 | −8.659474e−8 | 1.2542213e−10 | −6.6214841e−14 | −1.0583201e−17 | 2.1834647e−20 |
| 2 | −3.143952 | 3.8128909e−5 | −1.3036009e−7 | 2.3490044e−10 | −1.595244e−13 | −2.3343029e−18 | 3.3386459e−20 |
| 21 | 5.656857 | 5.7780988e−8 | 5.0172158e−9 | 5.67066e−12 | 1.4116746e−14 | 0.00 | 0.00 |
| 22 | −96.65446 | 1.8810461e−6 | −1.372124e−7 | −1.4116834e−10 | 2.6262719e−12 | −9.9308871e−15 | 1.4447615e−17 |
| 23 | −2.165457 | 3.4512883e−6 | −3.2416442e−8 | −4.9537585e−10 | 3.3877491e−12 | −9.6148395e−15 | 1.1066089e−17 |

TABLE 9-continued

| S | R | T | Nd | vd | TYPE |
|---|---|---|----|----|------|
| 18 | 35.68195 | 6.9571 | 1.455999 | 90.300000 | |
| 19 | -31.56879 | 3.626223 | | | |
| 20 | 33.3398 | 5.424156 | 1.518350 | 60.300000 | |
| 21 | -157.8581 | 0.5667947 | | | |
| 22 | 83.18422 | 3.34 | 1.491000 | 57.562379 | ASP |
| 23 | -137.8496 | 5.03 | | | ASP |
| 24 | INFINITY | 26 | 1.516800 | 64.199997 | |
| 25 | INFINITY | 3 | | | |
| 26 | INFINITY | 2.74 | 1.471693 | 65.849544 | |
| 27 | INFINITY | | | | |

The shapes of the lens surfaces $S_1$ and $S_2$ and the lens surfaces $S_{22}$ and $S_{23}$ are defined by the expression (19) indicated above. The aspheric coefficients "K", "D", "E", "F", "G", "H" and "I" have values indicated in Table 10 below.

TABLE 10

<ASPHERIC COEFFICIENT>

| S | K | D | E | F | G | H | I |
|---|---|---|---|---|---|---|---|
| 1 | 32.79982 | 3.5020967e-5 | -8.659474e-8 | 1.2542213e-10 | -6.6214841e-14 | -1.0583201e-17 | 2.1834647e-20 |
| 2 | -3.143952 | 3.8128909e-5 | -1.3036009e-7 | 2.3490044e-10 | -1.595244e-13 | -2.3343029e-18 | 3.3386459e-20 |
| 22 | -96.65446 | 1.8810461e-6 | -1.372124e-7 | -1.4116834e-10 | 2.6262719e-12 | -9.9308871e-15 | 1.4447615e-17 |
| 23 | -2.165457 | 3.4512883e-6 | -3.2416442e-8 | -4.9537585e-10 | 3.3877491e-12 | -9.6148395e-15 | 1.1066089e-17 |

The values of $f_2/f_3$, $|f_1|/f$, $|f_4|/f$, $f_5/f$, $|EXP|/f$ and $BFL/f$ in the retrofocus lens system 10 according to Embodiment 5 are indicated in Table 11, which is described later. Further, the values of $v_4$, $v_5$, $v_7$, $v_8$, $v_9$, $v_{10}$, dPgF4, dPgF5, dPgF7, dPgF8, dPgF9 and dPgF10 are indicated in Table 12, which is described later. The retrofocus lens system 10 according to Embodiment 5 therefore satisfies the expressions (1) to (18) indicated above. The values of dPgF of the fourth lens $L_4$, the fifth lens $L_5$, the seventh lens $L_7$, the eighth lens $L_8$, the ninth lens $L_9$ and the tenth lens $L_{10}$ are indicated in Table 17 together with the manufacturers' names and product numbers of glass materials (GLASS MATERIAL column in Table 17).

Figure 10B:
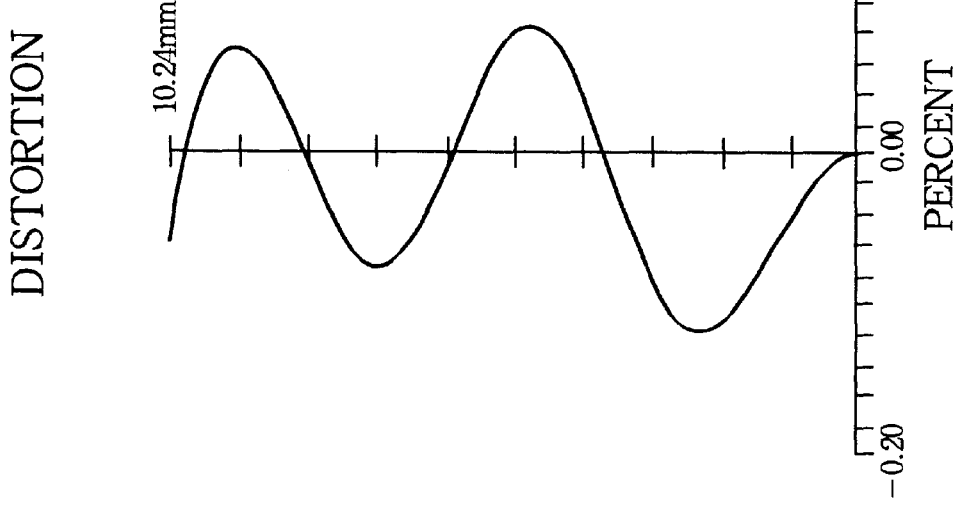
FIGS. 10A and 10B respectively show an astigmatism and a distortion of the retrofocus lens system according to Embodiment 5.
Figure 10A:
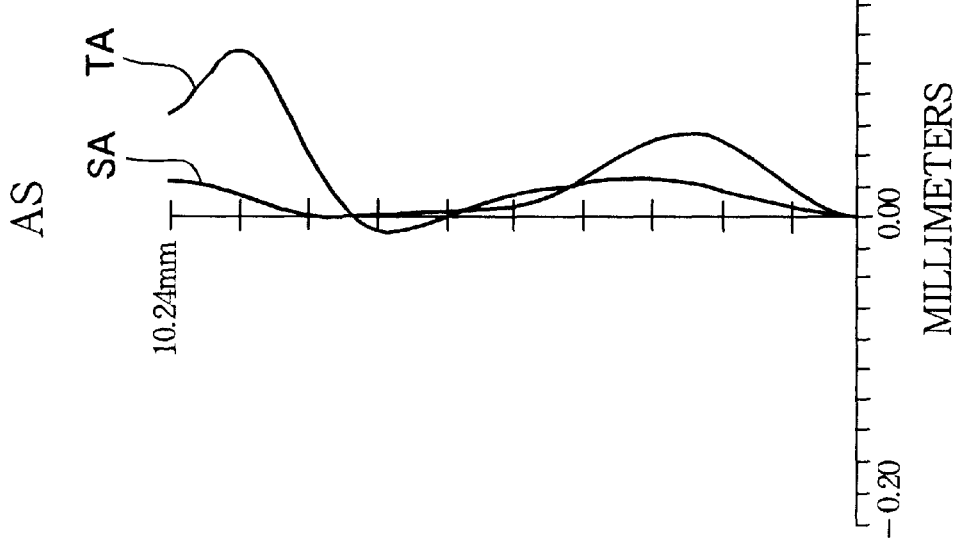
Figures 11A, 11B:
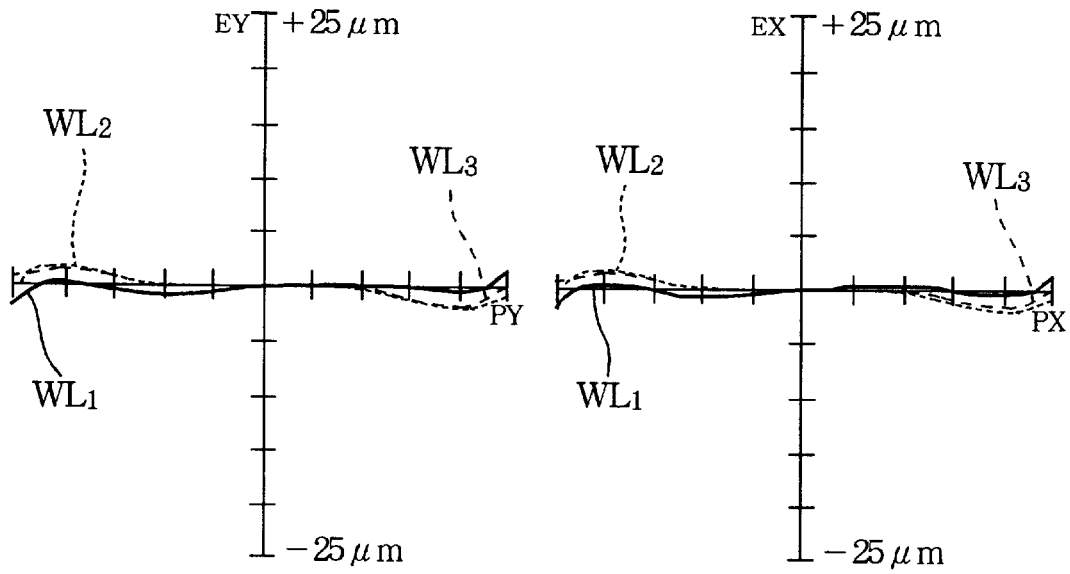
FIGS. 11A and 11B respectively show an axial lateral aberration of the retrofocus lens system according to Embodiment 5.
Figures 11C, 11D:
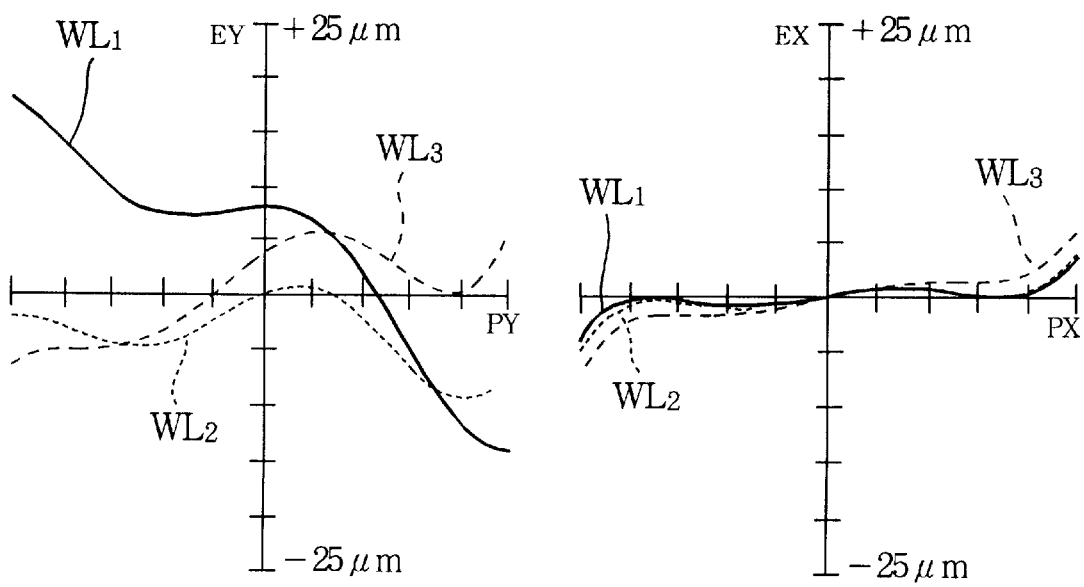
FIGS. 11C and 11D respectively show a lateral aberration at a maximum image height of the retrofocus lens system according to Embodiment 5.
Figure 12A:
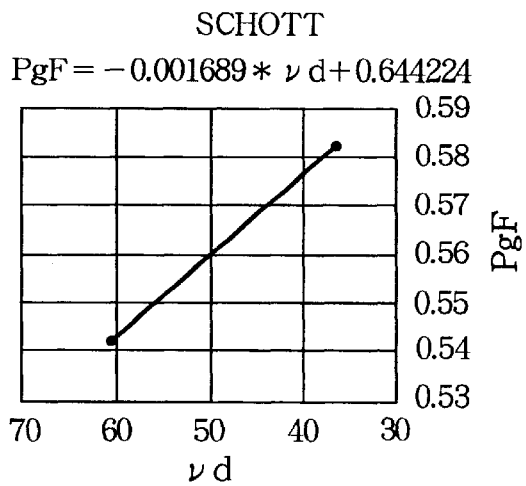
FIGS. 12A to 12D are diagrams respectively showing Abbe lines of different manufacturers.
Figure 12B:
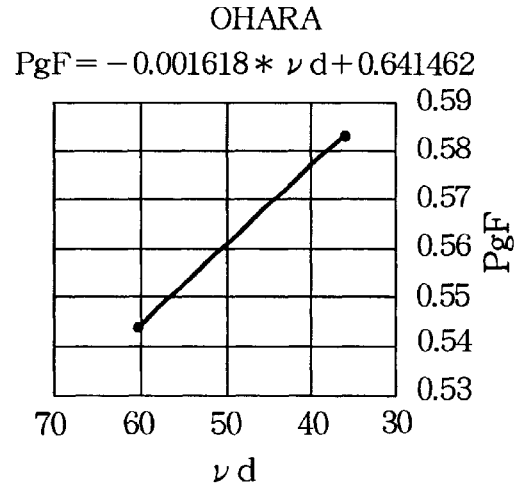
Figure 12C:
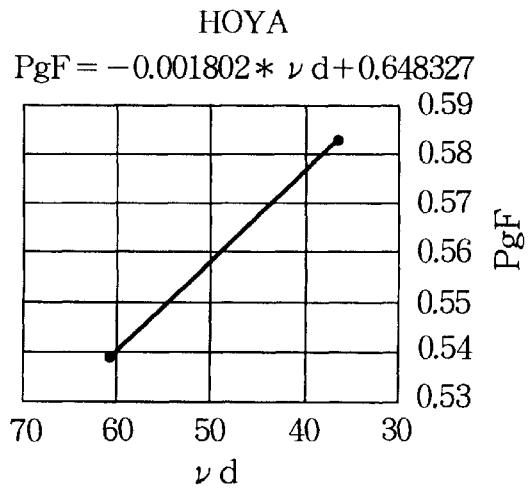
Figure 12D:
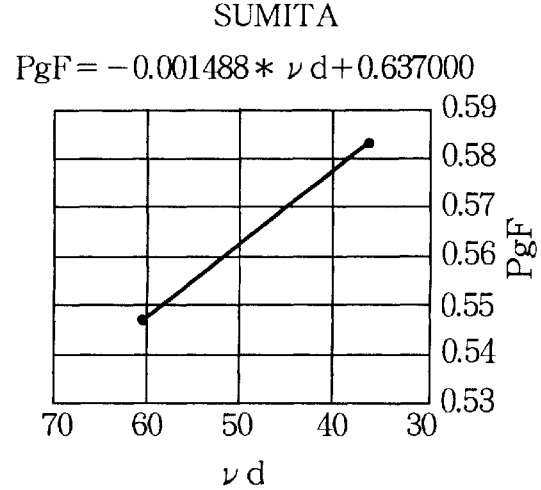

The astigmatism (AS) on the small conjugate side and the distortion of the present lens system are shown in FIGS. 10A and 10B, while the lateral aberration is shown in FIGS. 11A to 11D. The astigmatism and the distortion of light having a wavelength of 546.1 nm are plotted in FIGS. 10A and 10B. The lateral aberration with a wavelength $WL_1$ (=470 nm), a wavelength $WL_2$ (=$\sqrt[3]{6.1}$ nm), and a wavelength $WL_3$ (=610 nm) is plotted in FIGS. 11A to 11D. FIGS. 11A and 11B show the lateral aberration on the axis and FIGS. 11C and 11D show the lateral aberration at the maximum image height of 10.24 nm (with an angle of view of 40.8° on the screen side). In other respects, Embodiment 5 is the same as Embodiment 1.

All of the parameters appearing in the numerical examples Tables 1 to 10) described in connection with Embodiments 1 to 5 are collectively summarized in Tables 11 to 17 below.

TABLE 11

| EMBOD-IMENT | f(mm) | ω(deg) | F | β | f1 | f2 | f3 | EXP | f4 | f5 | BFL | \|f1\|/f | f2/f3 | \|f4\|/f | f5/f | \|EXP\|/f | BFL/f |
|---|---|---|---|---|---|---|---|---|---|---|---|---|---|---|---|---|---|
| 1 | 11.79 | 40.8 | 3.0 | 75.3 | -21.33 | 34.36 | 35.05 | -1332.6 | -526 | 105.8 | 28.40 | 1.8 | 1.0 | 44.6 | 9.0 | 113.0 | 2.4 |
| 2 | 11.78 | 40.8 | 3.0 | 75.3 | -21.43 | 35.82 | 34.19 | -1569.9 | -526 | 105.8 | 28.39 | 1.8 | 1.0 | 44.6 | 9.0 | 133.3 | 2.4 |
| 3 | 11.78 | 40.8 | 3.0 | 75.3 | -26.83 | 43.18 | 30.72 | -826.4 | -526 | 105.8 | 23.38 | 2.3 | 1.4 | 44.6 | 9.0 | 70.2 | 2.4 |
| 4 | 11.84 | 40.7 | 3.0 | 75.0 | -21.64 | 34.21 | 35.47 | -2859.1 | -526 | 105.8 | 28.40 | 1.8 | 1.0 | 44.4 | 8.9 | 241.5 | 2.4 |
| 5 | 11.77 | 40.8 | 3.0 | 75.4 | -23.05 | 41.07 | 34.28 | -1956.7 | -526 | 105.8 | 28.39 | 2.0 | 1.2 | 44.7 | 9.0 | 166.2 | 2.4 |

TABLE 12

| EMBODIMENT | v4 | v5 | v7 | v8 | v9 | v10 | dPgF4 | dPgF5 | dPgF7 | dPgF8 | dPgF9 | dPgF10 |
|---|---|---|---|---|---|---|---|---|---|---|---|---|
| 1 | 21.20 | 23.80 | 45.00 | 23.83 | 35.08 | 95.00 | 0.0220 | 0.0181 | 0.0005 | 0.0123 | 0.0011 | 0.0385 |
| 2 | 20.36 | 23.78 | 47.11 | 24.40 | 30.40 | 90.30 | 0.0217 | 0.0136 | -0.0001 | 0.0136 | 0.0055 | 0.0386 |
| 3 | 23.83 | 24.40 | 45.00 | 24.40 | 41.01 | 95.00 | 0.0123 | 0.0136 | 0.0005 | 0.0136 | -0.0084 | 0.0463 |
| 4 | 20.36 | 23.78 | 95.00 | 24.40 | 26.30 | 90.30 | 0.0217 | 0.0136 | 0.0385 | 0.0136 | 0.0146 | 0.0386 |
| 5 | 22.80 | 26.10 | 47.11 | 24.40 | 25.70 | 90.30 | 0.0261 | 0.0142 | -0.0001 | 0.0136 | 0.0162 | 0.0386 |

TABLE 13

EMBODIMENT 1

| LENS | GLASS MATERIAL | dPgF | MANUFACTURER |
|---|---|---|---|
| $L_4$ | PBH72 | 0.022 | OHARA |
| $L_5$ | TIH53 | 0.0181 | OHARA |
| $L_7$ | BAH13 | 0.0005 | OHARA |
| $L_8$ | SF57 | 0.0123 | SCHOTT |
| $L_9$ | LASF36A | 0.0011 | SCHOTT |
| $L_{10}$ | CAFK95 | 0.0385 | SUMITA |

TABLE 14

EMBODIMENT 2

| LENS | GLASS MATERIAL | dPgF | MANUFACTURER |
|---|---|---|---|
| $L_4$ | SF59 | 0.0217 | SCHOTT |
| $L_5$ | FDS90 | 0.0136 | HOYA |
| $L_7$ | BAFN10 | −0.0001 | SCHOTT |
| $L_8$ | SFLD60 | 0.0136 | SUMITA |
| $L_9$ | LASF32 | 0.0055 | SCHOTT |
| $L_{10}$ | S-FPL52 | 0.0386 | OHARA |

TABLE 15

EMBODIMENT 3

| LENS | GLASS MATERIAL | dPgF | MANUFACTURER |
|---|---|---|---|
| $L_4$ | SF57 | 0.0123 | SCHOTT |
| $L_5$ | SFLD60 | 0.0136 | SUMITA |
| $L_7$ | BAH13 | 0.0005 | OHARA |
| $L_8$ | SFLD60 | 0.0136 | SUMITA |
| $L_9$ | LASFN31 | −0.0084 | SCHOTT |
| $L_{10}$ | SFPL53 | 0.0463 | OHARA |

TABLE 16

EMBODIMENT 4

| LENS | GLASS MATERIAL | dPgF | MANUFACTURER |
|---|---|---|---|
| $L_4$ | SF59 | 0.0217 | SCHOTT |
| $L_5$ | FDS90 | 0.0136 | HOYA |
| $L_7$ | CAFK95 | 0.0385 | SUMITA |
| $L_8$ | SFLD60 | 0.0136 | SUMITA |
| $L_9$ | STIH23 | 0.0146 | OHARA |
| $L_{10}$ | SFPL52 | 0.0386 | OHARA |

TABLE 17

EMBODIMENT 5

| LENS | GLASS MATERIAL | dPgF | MANUFACTURER |
|---|---|---|---|
| $L_4$ | S-NPH1 | 0.0261 | OHARA |
| $L_5$ | FDS30 | 0.0142 | HOYA |
| $L_7$ | BAFN10 | −0.0001 | SCHOTT |
| $L_8$ | SFLD60 | 0.0136 | SUMITA |
| $L_9$ | S-TIH11 | 0.0162 | OHARA |
| $L_{10}$ | S-FPL52 | 0.0386 | OHARA |

In the tables, "f" denotes a focal distance of the whole lens system, ω denotes a half field angle of the projection light (large conjugate side), "F" denotes an effective F-value at the reference projecting magnification (small conjugate side), and β denotes a reference projecting magnification. Further, $f_1$ denotes the focal distance of the first lens group $G_1$, $f_2$ denotes the focal distance of the second lens group $G_2$, $f_3$ denotes the focal distance of the third lens group $G_3$, $f_4$ denotes the axial focal distance of the aspheric first lens $L_1$, and $f_5$ denotes the axial focal distance of the aspheric twelfth lens $L_{12}$. Furthermore, EXP denotes the distance from the image surface on the small conjugate side to the pupil surface on the small conjugate side in the whole lens system, and BFL denotes the back focal distance of the whole lens system (BFL is measured by removing the prism PSM and cover glass CG and irradiating the system with light from an infinite distance on the large conjugate side). The parameters given in Table 11 are determined all at the wavelength of 564.1 nm.

In addition, $v_4$ represents the Abbe number at d-line of a glass material which forms the fourth lens $L_4$, $v_5$ the Abbe number at d-line of a glass material which forms the fifth lens $L_5$, $v_7$ the Abbe number at d-line of a glass material which forms the seventh lens $L_7$, $v_8$ the Abbe number at d-line of a glass material which forms the eighth lens $L_8$, $v_9$ the Abbe number at d-line of a glass material which forms the ninth lens $L_9$, and $v_{10}$ the Abbe number at d-line of a glass which forms the tenth lens $L_{10}$. dPgF4 represents an anomalous dispersion of the glass material which forms the fourth lens $L_4$, dPgF5 an anomalous dispersion of the glass material which forms the fifth lens $L_5$, dPgF7 an anomalous dispersion of the glass material which forms the seventh lens $L_7$, dPgF8 an anomalous dispersion of the glass material which forms the eighth lens $L_8$, dPgF9 an anomalous dispersion of the glass material which forms the ninth lens $L_9$ and dPgF10 an anomalous dispersion of the glass material which forms the tenth lens $L_{10}$.

Embodiment 6

The projection display apparatus according to Embodiment 6 is configured by replacing the projection lens 7 of the projection display apparatus shown in FIG. 13 with the retrofocus lens system 10 of any embodiment described above. The projection display apparatus 300 according to Embodiment 6 has a thick dichroic prism 6 disposed between the liquid crystal panels 5R, 5G, and 5B and the projection lens 7. Accordingly, a projection lens of a rear projector or the like that requires wide-angle projection is required to have the following specifications and performances:

(1) Capability of wide-angle projection
(2) Long back focal distance in comparison with the focal distance
(3) Good telecentric characteristics on the light valve side and the principal ray in the prism component approximately parallel to the optical axis
(4) Good correction of chromatic aberration of magnification
(5) Small distortion
(6) Maintenance of desired imaging performance over a wide temperature range and small defocusing
(7) Appropriate correction of various aberrations in the best balance and capability of high-resolution projection of original image on a light valve having many pixels at a high density The retrofocus lens system of any embodiment described above satisfies the performances (1) to (7) indicated above. By incorporating the lens in the projection display apparatus as shown in FIG. 13, a compact projection display apparatus that features a high picture quality and low cost and can be used in a wide temperature range can be realized.

Embodiment 7

Figure 14:
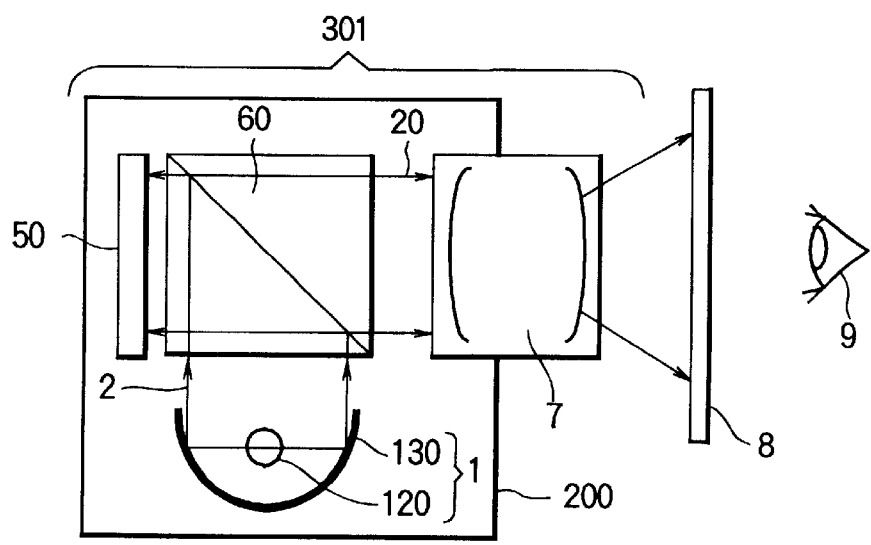
FIG. 14 is a schematic diagram showing a configuration of an optical system of a projection display apparatus according to Embodiment 7 of the present invention.

FIG. 14 is a schematic diagram showing a configuration of an optical system of a projection display apparatus 301 according to Embodiment 7 of the present invention. As shown in FIG. 14, the projection display apparatus 301 comprises a light source 1 which has a lamp 120 and a reflecting mirror 130 and outputs approximately parallel illuminating light 2, a reflective liquid crystal panel 50 displaying color images, a polarizing beam splitter 60 which reflects and directs the light 2 from the light source 1 onto the reflective liquid crystal panel 50 and passes the reflected light 20 from the reflective liquid crystal panel 50, and the projection lens 7 which projects the incident light 20 onto the screen 8 with a magnification. The projection lens 7 of Embodiment 7 is the retrofocus lens system 10 of any embodiment described above. In the figure, a reference numeral 200 denotes a housing.

On the reflective liquid crystal panel 50, a reflecting mirror is formed for each pixel and modulates the polarizing state in a cross section of the illuminating light and spectrum. When the light 20 reflected by the liquid crystal panel 50 pass the polarizing beam splitter 60, the modulation of the polarizing state is converted to intensity modulation, and the projection lens 7 projects a magnified image onto the screen 8.

The retrofocus lens system of any embodiment described above satisfies the performances (1) to (7) indicated above. By incorporating the lens in a projection display apparatus as shown in FIG. 14, a compact projection display apparatus which features a high picture quality and low cost and can be used in a wide temperature range can be realized.

Embodiment 8

Figure 15:
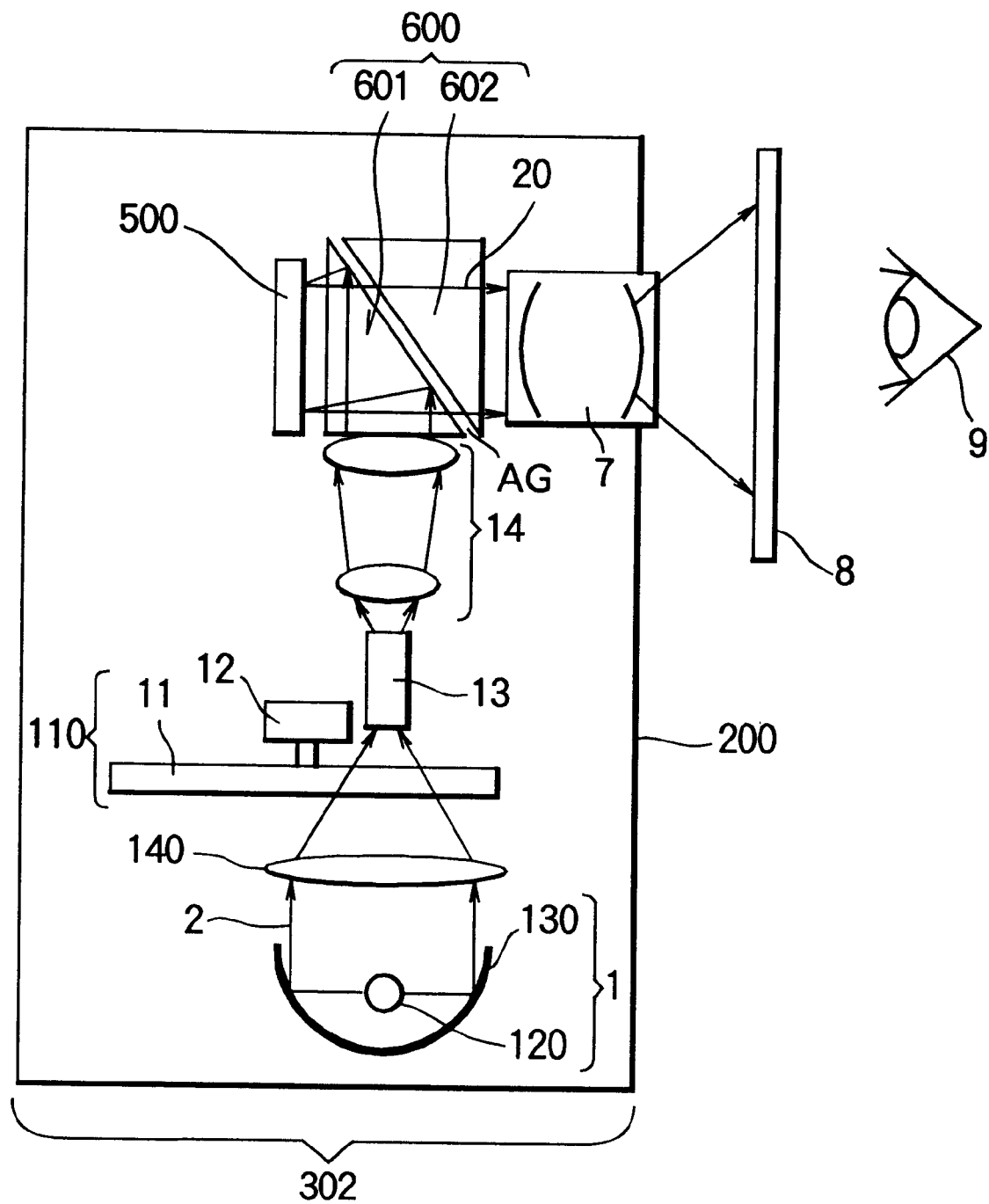
FIG. 15 is a schematic diagram showing a configuration of an optical system of a projection display apparatus according to Embodiment 8 of the present invention.

FIG. 15 shows a schematic configuration of the optical system of the projection display apparatus according to Embodiment 8 of the present invention. As shown in FIG. 15, the projection display apparatus 302 comprises a light source 1 which has a lamp 120 and a reflecting mirror 130 and outputs approximately parallel illuminating light 2, a condenser lens 140, and a color wheel unit 110. The color wheel unit 110 comprises a color filter 11 having an array of angularly divided regions through which the primary R-G-B colors transmit and a motor 12 for turning the filter 11. The projection display apparatus 302 also comprises a rod integrator 13, a relay lens system 14, and a total internal reflection (TIR) prism 600 which totally reflects approximately telecentric light. The TIR prism 600 includes a first prism block 601 and a second prism block 602, and inclined surfaces of the two blocks 601 and 602 face each other with a minute air gap AG in between.

The projection display apparatus 302 further comprises a digital micromirror device (DMD™) 500 and a projection lens 7. The DMD 500 is an image display component utilizing micro electromechanical system (MEMS) technology. The DMD 500 is a spatial modulator in which arrays of micromirrors are disposed in the two-dimensional plane, and the inclination of each mirror is modulated to ON or OFF state within the component surface. In Embodiment 8, the projection lens 7 is the retrofocus lens system 10 of any embodiment described above. In the figure, a reference numeral 200 denotes a housing.

The light striking the inclined surface of the first prism block 601 are totally reflected because of the difference in refractive index between the glass material forming the prism and the air gap AG and directed onto the DMD 500. The light 20 reflected by the micromirror in ON-state in a surface of the DMD 500 passes each surface of the TIR prism 600, a magnified image is formed on the screen 8 by the projection lens 7, and a viewer 9 can see the image.

The retrofocus lens system of any embodiment described above satisfies the performances (1) to (7) indicated above. By incorporating the lens in a projection display apparatus as shown in FIG. 15, a compact projection display apparatus which features a high picture quality and low cost and can be operated in a wide temperature range can be realized.

In place of the DMD 500, a grating light valve (GLV™) component may be used. The GLV component includes a lot of movable grating elements densely arranged like a two or one-dimensional array using the MEMS technique. By replacing the DMD component with the GLV component, full color image can be displayed.

The type of light valve components is not limited to those shown in Embodiments 6 to 8.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A retrofocus lens system comprising in order from a large conjugate side toward a small conjugate side:

a first lens group having a negative refracting power;

a second lens group having a positive refracting power; and a third lens group having a positive refracting power;

said first lens group including in order from the large conjugate side toward the small conjugate side, a first lens having an aspheric surface, a meniscus second lens having a negative refracting power and having a convex surface on the large conjugate side, a meniscus third lens having a negative refracting power and having a convex surface on the large conjugate side, and a meniscus fourth lens having a negative refracting power and having a convex surface on the small conjugate side;

said second lens group including in order from the large conjugate side toward the small conjugate side, a fifth lens having a positive refracting power, and a sixth lens joined to said fifth lens;

said third lens group including in order from the large conjugate side toward the small conjugate side, a meniscus seventh lens having a positive refracting power and having a convex surface on the small conjugate side, a biconcave eighth lens, a ninth lens joined to said eighth lens and having a positive refracting power, a biconvex tenth lens, a biconvex eleventh lens, and a twelfth lens having an aspheric surface;

wherein said retrofocus lens system satisfies the following expressions:

$0.8 < f_2/f_3 < 1.5$ $1.6 < |f_1|/f < 2.4$ $|f_4|/f > 30$ $f_5/f > 6$ where f is a focal distance of the whole lens system, $f_2$ is a focal distance of said second lens group, $f_3$ is a focal distance of said third lens group, $|f_1|$ is an absolute value of a focal distance of said first lens group, $|f_4|$ is an absolute value of an axial focal distance of said first lens, and $f_5$ is an axial focal distance of said twelfth lens.

2. The retrofocus lens system of claim 1, further comprising a stop disposed between said second lens group and said third lens group;

wherein said retrofocus lens system satisfies the following expression:

$$|EXP|/f > 50$$

where $|EXP|$ is an absolute value of a distance from an image surface on the small conjugate side to a pupil surface on the small conjugate side in the whole lens system.

3. The retrofocus lens system of claim 1, satisfying the following expression:

$$BFL/f > 2$$

where BFL is a back focal distance of the whole lens system.

4. The retrofocus lens system of claim 1, satisfying the following expressions:

$$15 < v_4 < 30$$

$$15 < v_5 < 30$$

$$40 < v_7 < 100$$

$$15 < v_8 < 32$$

$$20 < v_9 < 50$$

$$70 < v_{10} < 100$$

where $v_4$ is an Abbe number at d-line of a glass material forming said fourth lens, $v_5$ is an Abbe number at d-line of a glass material forming said fifth lens, $v_7$ is an Abbe number at d-line of a glass material forming said seventh lens, $v_8$ is an Abbe number at d-line of a glass material forming said eighth lens, $v_9$ is an Abbe number at d-line of a glass material forming said ninth lens, and $v_{10}$ is an Abbe number at d-line of a glass material forming said tenth lens.

5. The retrofocus lens system of claim 4, satisfying the following expressions:

$$dPgFm = PgFma(v_d) - PgFn(v_d)$$

$$0.008 < dPgF4 < 0.03$$

$$0.01 < dPgF5 < 0.025$$

$$0.01 < dPgF8 < 0.02$$

$$0.03 < dPgF10 < 0.055$$

where dPgFm denotes a parameter representing anomalous dispersive properties of the glass material which forms the m-th lens, m being equal to 4, 5, 8 or 10, $PgFn(v_d)$ denotes a straight line representing a normal partial dispersion ratio in a coordinate system that has the abscissa indicating the Abbe number $v_d$ at d-line and the ordinate indicating a partial dispersion ratio PgF from F-line to g-line, and $PgFma(v_d)$ denotes an anomalous partial dispersion ratio of the glass material which forms the m-th lens having the Abbe number $v_d$ at d-line.

6. The retrofocus lens system of claim 4, satisfying the following expressions:

$$dPgFm = PgFma(v_d) - PgFn(v_d)$$

$$-0.01 < dPgF7 < 0.045$$

$$-0.015 < dPgF9 < 0.02$$

where dPgFm denotes a parameter representing anomalous dispersive properties of the glass material which forms the m-th lens, m being equal to 7 or 9, $PgFn(v_d)$ denotes a straight line representing a normal partial dispersion ratio in a coordinate system that has the abscissa indicating the Abbe number $v_d$ at d-line and the ordinate indicating a partial dispersion ratio PgF from F-line to g-line, and $PgFma(v_d)$ denotes an anomalous partial dispersion ratio of the glass material which forms the m-th lens having the Abbe number $v_d$ at d-line.

7. A projection display apparatus comprising:

a light source for emitting light;

a light valve for two-dimensionally modulating the light from said light source; and a retrofocus lens system for projecting with a magnification the light modulated by said light valve;

said retrofocus lens system comprising in order from a large conjugate side toward a small conjugate side:

a first lens group having a negative refracting power;

a second lens group having a positive refracting power; and a third lens group having a positive refracting power;

said first lens group including in order from the large conjugate side toward the small conjugate side, a first lens having an aspheric surface, a meniscus second lens having a negative refracting power and having a convex surface on the large conjugate side, a meniscus third lens having a negative refracting power and having a convex surface on the large conjugate side, and a meniscus fourth lens having a negative refracting power and having a convex surface on the small conjugate side;

said second lens group including in order from the large conjugate side toward the small conjugate side, a fifth lens having a positive refracting power, and a sixth lens joined to said fifth lens;

said third lens group including in order from the large conjugate side toward the small conjugate side, a meniscus seventh lens having a positive refracting power and having a convex surface on the small conjugate side, a biconcave eighth lens, a ninth lens joined to said eighth lens and having a positive refracting power, a biconvex tenth lens, a biconvex eleventh lens, and a twelfth lens having an aspheric surface;

wherein said retrofocus lens system satisfies the following expressions:

$$0.8 < f_2/f_3 < 1.5$$

$$1.6 < |f_1|/f < 2.4$$

$$|f_4|/f > 30$$

$$f_5/f > 6$$

where f is a focal distance of the whole lens system, $f_2$ is a focal distance of said second lens group, $f_3$ is a focal distance of said third lens group, $|f_1|$ is an absolute value of a focal distance of said first lens group, $|f_4|$ is an absolute value of an axial focal distance of said first lens, and $f_5$ is an axial focal distance of said twelfth lens.

8. The projection display apparatus of claim 7, wherein said retrofocus lens system further comprises a stop disposed between said second lens group and said third lens group; and said retrofocus lens system satisfies the following expression:

$$|EXP|/f > 50$$

where |EXP| is an absolute value of a distance from an image surface on the mall conjugate side to a pupil surface on the small conjugate side in the whole lens system.

9. The projection display apparatus of claim 7, wherein said retrofocus lens system satisfies the following expression:

$$BFL/f>2$$

where BFL is a back focal distance of the whole lens system.

10. The projection display apparatus of claim 7, wherein said retrofocus lens system satisfies the following expressions:

$$15<v_4<30$$

$$15<v_5<30$$

$$40<v_7<100$$

$$15<v_8<32$$

$$20<v_9<50$$

$$70<v_{10}<100$$

where $v_4$ is an Abbe number at d-line of a glass material forming said fourth lens, $v_5$ is an Abbe number at d-line of a glass material forming said fifth lens, $v_7$ is an Abbe number at d-line of a glass material forming said seventh lens, $v_8$ is an Abbe number at d-line of a glass material forming said eighth lens, $v_9$ is an Abbe number at d-line of a glass material forming said ninth lens, and $v_{10}$ is an Abbe number at d-line of a glass material forming said tenth lens.

11. The projection display apparatus of claim 7, wherein said retrofocus lens system satisfies the following expressions:

$$dPgFm=PgFma(v_d)-PgFn(v_d)$$

$$0.008<dPgF4<0.03$$

$$0.01<dPgF5<0.025$$

$$0.01<dPgF8<0.02$$

$$0.03<dPgF10<0.055$$

where dPgFm denotes a parameter representing anomalous dispersive properties of the glass material which forms the m-th lens, m being equal to 4, 5, 8 or 10, $PgFn(v_d)$ denotes a straight line representing a normal partial dispersion ratio in a coordinate system that has the abscissa indicating the Abbe number $v_d$ at d-line and the ordinate indicating a partial dispersion ratio PgF from F-line to g-line, and $PgFma(v_d)$ denotes an anomalous partial dispersion ratio of the glass material which forms the m-th lens having the Abbe number $v_d$ at d-line.

12. The projection display apparatus of claim 7, wherein said retrofocus lens system satisfies the following expressions:

$$dPgFm=PgFma(v_d)-PgFn(v_d)$$

$$-0.01<dPgF7<0.045$$

$$-0.015<dPgF9<0.02$$

where dPgFm denotes a parameter representing anomalous dispersive properties of the glass material which forms the m-th lens, m being equal to 7 or 9, $PgFn(v_d)$ denotes a straight line representing a normal partial dispersion ratio in a coordinate system that has the abscissa indicating the Abbe number $v_d$ at d-line and the ordinate indicating a partial dispersion ratio PgF from F-line to g-line, and $PgFma(v_d)$ denotes an anomalous partial dispersion ratio of the glass material which forms the m-th lens having the Abbe number $v_d$ at d-line.

13. The projection display apparatus of claim 7, wherein said light valve is a liquid crystal light valve.

14. The projection display apparatus of claim 7, wherein said light valve is a digital micromirror device which has an array of a plurality of movable microscopic unit mirrors.

15. The projection display apparatus of claim 7, wherein said light valve is a grating light valve that has a grating array including a plurality of unit gratings, which are respectively capable of modulating phase of the light from said light source.

* * * * *